United States Patent
Seo et al.

(10) Patent No.: US 9,575,706 B2
(45) Date of Patent: Feb. 21, 2017

(54) FLEXIBLE DISPLAY APPARATUS AND CONTROL METHOD THEREOF

(71) Applicant: SAMSUNG ELECTRONICS CO., LTD., Suwon-si (KR)

(72) Inventors: Joon-kyu Seo, Suwon-si (KR); Kyung-a Kang, Seoul (KR); Nipun Kumar, Suwon-si (KR); Yong-yeon Lee, Suwon-si (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 332 days.

(21) Appl. No.: 14/029,102

(22) Filed: Sep. 17, 2013

(65) Prior Publication Data
US 2014/0078046 A1   Mar. 20, 2014

(30) Foreign Application Priority Data
Sep. 17, 2012   (KR) .................. 10-2012-0102929

(51) Int. Cl.
| G06F 3/14 | (2006.01) |
|---|---|
| G06F 1/16 | (2006.01) |
| G06F 3/01 | (2006.01) |
| G06F 3/0485 | (2013.01) |

(52) U.S. Cl.
CPC ............... *G06F 3/14* (2013.01); *G06F 1/1626* (2013.01); *G06F 1/1652* (2013.01); *G06F 1/1694* (2013.01); *G06F 3/017* (2013.01); *G06F 3/0485* (2013.01); *G06F 2203/04806* (2013.01)

(58) Field of Classification Search
CPC ................... G06F 1/1652; G06F 2203/04102; G09G 2380/02; H04M 1/0268
USPC .................................................. 345/156, 173
See application file for complete search history.

(56) References Cited

U.S. PATENT DOCUMENTS

| 2003/0076343 | A1 | 4/2003 | Fishkin et al. | |
|---|---|---|---|---|
| 2003/0227441 | A1* | 12/2003 | Hioki | G06F 3/0412 345/156 |
| 2004/0008191 | A1* | 1/2004 | Poupyrev | G06F 3/011 345/184 |
| 2010/0011291 | A1 | 1/2010 | Nurmi | |
| 2010/0056223 | A1 | 3/2010 | Choi et al. | |
| 2010/0117975 | A1 | 5/2010 | Cho | |
| 2010/0164888 | A1* | 7/2010 | Okumura | G06F 1/1626 345/173 |
| 2011/0057873 | A1* | 3/2011 | Geissler | G06F 1/1626 345/156 |

(Continued)

OTHER PUBLICATIONS

International Search Report (PCT/ISA/210) dated Jan. 22, 2014 issued by the International Searching Authority in International Application No. PCT/KR2013/008462.

(Continued)

*Primary Examiner* — Koosha Sharifi-Tafreshi
(74) *Attorney, Agent, or Firm* — Sughrue Mion, PLLC

(57) ABSTRACT

A flexible display apparatus is provided. The flexible display apparatus includes: a display that is bendable, a sensor configured to sense deformation of the display, and a controller configured to perform an operation corresponding to the sensed shape deformation in response to the sensed deformation being shape deformation in which the display is alternately bent in opposing directions within a predetermined time.

23 Claims, 30 Drawing Sheets

(56) References Cited

U.S. PATENT DOCUMENTS

| 2012/0038613 | A1 | 2/2012 | Choi |
| 2012/0115422 | A1 | 5/2012 | Tziortzis et al. |
| 2012/0133621 | A1* | 5/2012 | Kim .................. H04M 1/0206 345/204 |
| 2013/0120239 | A1* | 5/2013 | Suzuki ................ G06F 1/1643 345/156 |

OTHER PUBLICATIONS

Written Opinion (PCT/ISA/237) dated Jan. 22, 2014 issued by the International Searching Authority in International Application No. PCT/KR2013/008462.

Communication dated Feb. 2, 2016, issued by European Patent Office in counterpart European Patent Application No. 13838025.8.

* cited by examiner

FLEXIBLE DISPLAY APPARATUS AND
CONTROL METHOD THEREOF

CROSS-REFERENCE TO RELATED
APPLICATION

This application claims priority from Korean Patent Application No. 10-2012-0102929, filed in the Korean Intellectual Property Office on Sep. 17, 2012, the disclosure of which is incorporated herein by reference in its entirety.

BACKGROUND

1. Field

Apparatuses and methods consistent with exemplary embodiments relate to a flexible display apparatus and a control method thereof, and more particularly, to a flexible display apparatus including a flexible display which can have its shape changed, and a control method thereof.

2. Description of the Related Art

With the development of electronic technologies, various kinds of display apparatuses have been developed and implemented in various apparatus applications. For example, a variety of display kinds, such as Cathode ray tube display (CRT), Light-emitting diode display (LED), Electroluminescent display (ELD), Electronic paper (E-Ink), Plasma display panel (PDP), Liquid crystal display (LCD), High-Performance Addressing display (HPA), Thin-film transistor display (TFT), and Organic light-emitting diode display (OLED) displays have been developed which have been implements into display apparatuses such as television (TVs), personal computers (PCs), laptops, tablet PCs, mobile phones, and MP3 players which are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus refers to a display apparatus that can be deformed or deformed into different shapes and configuration like paper.

The flexible display apparatus can be deformed by a force that is applied by a user and thus may be used for various purposes. For instance, the flexible display apparatus may be used for mobile apparatuses such as mobile phones, tablet PCs, electronic albums, personal digital assistants (PDAs), and MP3 players.

The flexible display apparatus has flexibility unlike existing display apparatuses. Therefore, there may be a demand for a method for applying this characteristic as an inputting means for the flexible display apparatus.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a flexible display apparatus which recognizes a shaking manipulation and a swinging manipulation as inputting means and performs a corresponding operation, and a control method thereof.

According to an aspect of an exemplary embodiment, there is provided a flexible display apparatus including: a display that is bendable; a sensor configured to sense deformation of the display; and a controller configured to perform an operation corresponding to the sensed shape deformation in response to the sensed deformation being shape deformation in which the display is alternately bent in opposing directions within a predetermined time.

The shape deformation may be shape deformation in which the display is bent in a first direction, returns to its original state, is bent in a second direction opposite the first direction, and returns again to its original state, and wherein the shape deformation is repeated at least one time.

The sensor may be further configured to sense a user grip on the display, and, wherein the controller is further configured to determine that a shaking manipulation is performed in response to a user grip being sensed on one edge of the display and the sensed deformation being the shape deformation.

The display is configured to display a plurality of objects and the controller is further configured to control the display to rearrange the displayed plurality of objects according to a predetermined criterion, in response to determining the shaking manipulation is performed.

The display is configured to display a plurality of objects and the controller is further configured to control the display to move at least one object which is selected from among the plurality of objects according to a user command in a direction opposite an area where the user grip is sensed, in response to determining the shaking manipulation is performed.

The controller is further configured to control the display to delete the at least one moved object.

The flexible display apparatus may further include a communicator configured to communicate with other devices, and the controller is further configured to control the communicator to transmit, to at least one of other devices, content corresponding to the at least one moved object.

The display is configured to display a plurality of objects and the controller is configured to control the display to delete objects among the plurality of objects other than at least one object that is displayed on an area where the user grip is sensed, in response to determining the shaking manipulation is performed.

The sensor is configured to sense a user grip on the display, wherein the controller further configured to determine that a swinging manipulation is performed in response to the user grip being sensed on opposite edges of the display and the sensed deformation being the shape deformation.

The display is configured to display a plurality of objects and the controller is further configured to control the display to delete at least one object which is selected from among the plurality of objects according to a user command, and rearrange the at least one selected object and display the object in response to determining the swinging manipulation is performed.

According to an aspect of another exemplary embodiment, there is provided a control method of a flexible display apparatus including a display that is bendable, the method including: sensing deformation of the display; and performing an operation corresponding to the sensed deformation in response to the sensed deformation being shape deformation in which the display is alternately bent in opposing directions within a predetermined time.

The shape deformation may be shape deformation in which the display is bent in a first direction, returns to its original state is bent in a second direction opposite the first direction, and returns again to its original state, and that is repeated at least one time.

The sensing may include sensing a user grip on the display, and the performing may include, determining that a shaking manipulation is performed, and performing an operation corresponding to the shaking manipulation in response to a user grip being sensed on one edge of the display and the sensed deformation being the shape deformation.

The performing may include, rearranging a plurality of objects displayed on the display according to a predetermined criterion in response to the determining that the shaking manipulation is performed.

The performing may include, moving at least one object which is selected from among a plurality of objects displayed on the display according to a user command in a direction opposite to an area where the user grip is sensed, in response to the determining the shaking manipulation is performed.

The performing may include deleting the at least one moved object.

The method may further include transmitting the at least one moved object to other devices.

The performing may include, deleting a plurality of objects other than at least one object that is displayed on an area where the user grip is sensed in response to the plurality of objects being displayed on the display and the shaking manipulation being performed.

The sensing may include sensing a user grip on the display, and the performing may include, determining that a swinging manipulation is performed, and performing an operation corresponding to the swinging manipulation, in response to the user grip being sensed on opposite edges of the display and the sensed deformation being the shape deformation.

The performing may include, deleting at least one object which is selected from among a plurality of objects displayed on the display according to a user command, and rearranging the at least one selected object and displaying the object, in response to and the determining that the swinging manipulation is performed.

According to various exemplary embodiments as described above, the shaking or swinging manipulation may be used as inputting means and various operations may be performed. Accordingly, user's convenience can be improved.

BRIEF DESCRIPTION OF THE FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
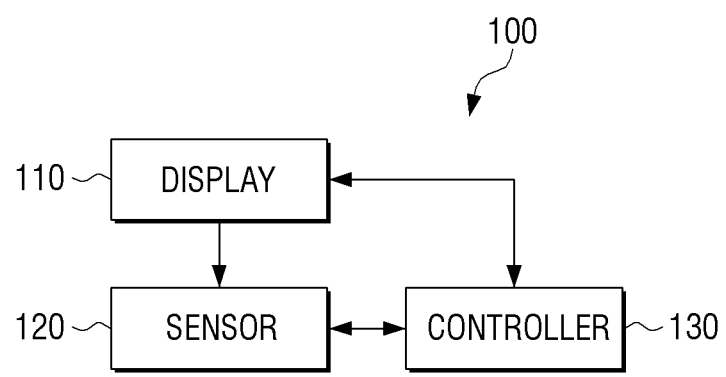
FIG. 1 is a block diagram illustrating a configuration of a flexible display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail because they would obscure the exemplary embodiments with unnecessary detail.

FIG. 1 is a block diagram illustrating a flexible display apparatus according to an exemplary embodiment. Referring to FIG. 1, a flexible display apparatus 100 includes a display 110, a sensor 120, and a controller 130.

The flexible display apparatus 100 of FIG. 1 may be implemented in the form of various types of apparatuses which can be easily carried and have a display function, such as a mobile phone including a smartphone, a portable multimedia player (PMP), a personal digital assistant (PDA), a tablet PC, and a navigation system. Also, the flexible display apparatus 100 may be implemented in the form of a stationary type apparatus such as a monitor, a television (TV), and a kiosk in addition to the portable apparatus.

The display 110 displays various screens. Specifically, the display 110 may display a playback screen or an execution screen of content such as an image, a moving image, a text, and music, and may display various user interface (UI) screens. For example, when various contents are played back through various applications installed in the flexible display apparatus 100, the display 110 may display a content playback screen which is provided by a corresponding application.

The flexible display apparatus 100 including the display 110 can be bent (e.g., deformed). Accordingly, the flexible display apparatus 100 and the display 110 should have a flexible structure and be made of a flexible material. Hereinafter, a detailed configuration of the display 110 will be explained with reference to FIG. 2.

Figure 2:
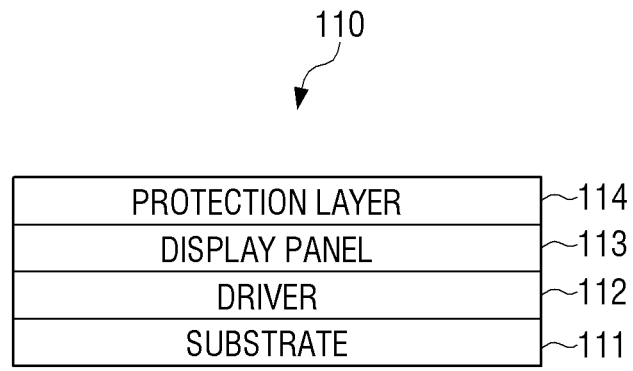
FIG. 2 is a view illustrating a basic configuration of a display of a flexible display apparatus according to an exemplary embodiment.

FIG. 2 is a view to illustrate a basic configuration of the display which constitutes the flexible display apparatus according to an exemplary embodiment. Referring to FIG. 2, the display 110 includes a substrate 111, a driver 112, a display panel 113, and a protection layer 114.

The flexible display apparatus may be an apparatus that can be bent, deformed, crooked, folded or rolled like paper, while having display characteristics of a flat panel display apparatus. Accordingly, the flexible display apparatus should be manufactured on a flexible substrate.

Specifically, the substrate 111 may be implemented in the form of a plastic substrate (for example, a polymer film) which is deformable by an external pressure.

The plastic substrate has a structure which may be formed by barrier coating opposite surfaces of a base film. The base film may be implemented in the form of various resins such as polyimide (PI), polycarbonate (PC), polyethyleneterephtalate (PET), polyethersulfone (PES), polythylenenaphthalate (PEN), and fiber reinforced plastic (FRP). The barrier coating may be performed on the opposite surfaces of the base film. An organic membrane or an inorganic membrane may be used for the purpose of maintaining flexibility.

The substrate 111 may also be formed of a flexible material such as thin glass or metal foil.

The driver 112 drives the display panel 113. Specifically, the driver 112 applies a driving voltage to a plurality of pixels which constitute the display panel 113, and may be implemented in the form of a-si TFT, a low temperature poly silicon (LTPS) TFT, or an organic TFT (OTFT) and so on. The driver 112 may also be implemented in various forms according to the form of the display panel 113. For instance, the display panel 113 may consist of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented in the form of an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). When the display panel 113 is embodied by the LCD, it cannot emit light by itself and thus may require a separate backlight unit. When the LCD does not use backlight, it may use ambient light. In order to use the LCD display panel 113 without the backlight unit, an environment such as an outdoor environment which admits plenty of light may be used to operate the LCD.

The protection layer 114 protects the display panel 113. For example, the protection layer 114 may be made of ZrO, CeO2, or Th O2. The protection layer 114 may be manufactured as a transparent film and may cover the entire surface of the display panel 113.

The display 110 may also be implemented in the form of electronic paper (e-paper). The e-paper is a display that applies general ink characteristics to paper, and is different from a general flat panel display in that it uses reflected light. The electronic paper may change a picture or text using electrophoresis, which uses a twist ball or a capsule.

When the display 110 is comprised of elements which are made of a transparent material, the display 110 may be implemented as a display apparatus that may be bendable and transparent. For example, when the substrate 111 is made of a polymer material such as plastic having transparency, when the driver 112 is implemented in the form of a transparent transistor, and when the display panel 113 is implemented in the form of a transparent organic light emitting layer and a transparent electrode, the display 110 may have transparency.

The transparent transistor refers to a transistor that may be manufactured by substituting opaque silicon of an existing thin film transistor with a transparent material such as zinc oxide or titanium oxide. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials.

As described above, the display 110 may be bent by an external force and thus have its shape changed. Hereinafter, a method for sensing bending of the flexible display apparatus 100 will be explained with reference to FIGS. 3 to 5.

FIGS. 3A through 5 are views illustrating an example of a method for sensing bending of the flexible display apparatus according to an exemplary embodiment.

The sensor 120 senses bending of the display 110. The "bending" recited herein refers to a state in which the display 110 may be bent.

To achieve this, the sensor 120 includes a bend sensor which may be disposed on one surface such as a front surface or a rear surface of the display 110, or a bend sensor which may be disposed on opposite surfaces of the display 110.

The bend sensor refers to a sensor that can be bent and has a resistance value which varies according to a degree of bending. The bend sensor may be implemented in various forms such as an optical fiber bend sensor, a pressure sensor, and a strain gauge.

Figure 3A:
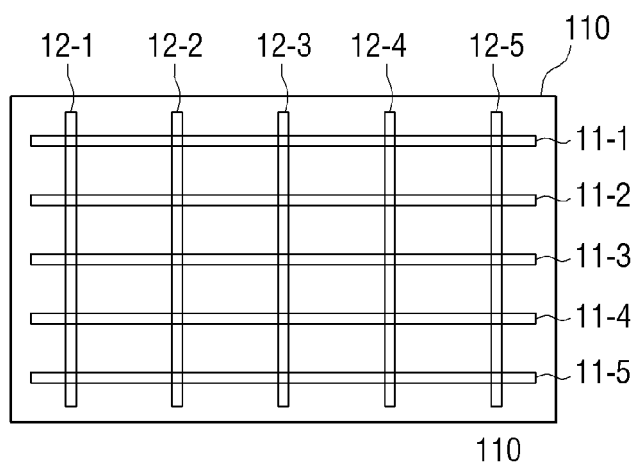
FIGS. 3A through 5 are views illustrating an example of a method for sensing bending of a flexible display apparatus according to an exemplary embodiment.
Figure 3B:
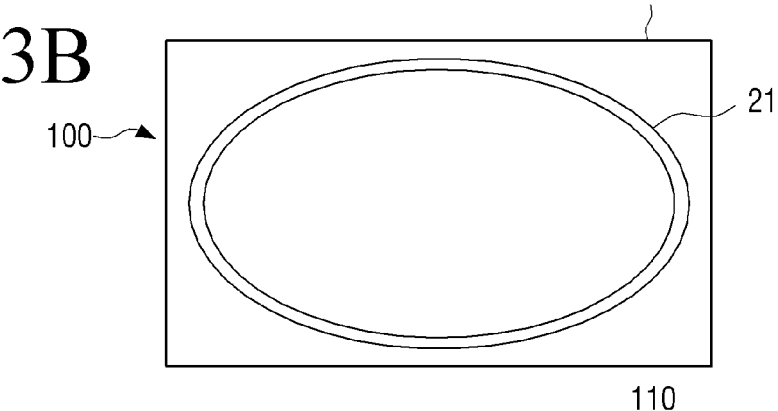
Figure 3C:
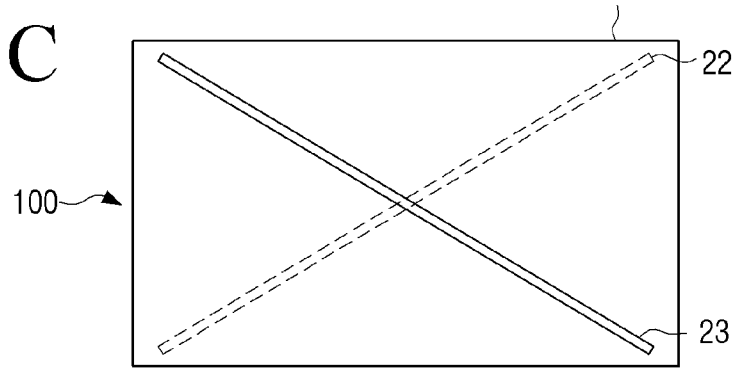

FIGS. 3A through 3C are views illustrating arrangements of bend sensors according to an exemplary embodiment.

FIG. 3A illustrates an example of a plurality of bar-shaped bend sensors which are arranged in the display 110 in a vertical direction and a horizontal direction in a grid pattern. Specifically, the bend sensors includes bend sensors 11-1 to 11-5 which are arranged in a first direction, and bend sensors 12-1 to 12-5 which are arranged in a second direction which may be perpendicular to the first direction. The bend sensors are disposed away from one another by a predetermined distance.

In FIG. 3A, five bend sensors (11-1 to 11-5, 12-1 to 12-5) are arranged in each of the horizontal direction and the vertical direction in a grid formation. However, this is merely an example and the number of bend sensors may be changed according to a size of the display 110. The bend sensors are arranged in the horizontal direction and the vertical direction to sense bending from the entire area of the display 110. Therefore, when only a part of the flexible display apparatus is flexible or when the flexible display apparatus needs to sense bending from only a part of the apparatus, the bend sensor may be arranged in only a corresponding portion of the apparatus.

The bend sensors may be embedded in a front surface of the display 110 as shown in FIG. 3A. However, this is merely an example and the bend sensors may be embedded in a rear surface of the display 110 or may be embedded in both surfaces.

Also, the shapes, number, and locations of the bend sensors may be variously changed. For example, a single bend sensor or a plurality of bend sensors may be connected with the display 110. The single bend sensor may sense a single bending data and may have a plurality of sensing channels to sense a plurality of bending data.

FIG. 3B illustrates an example of a single bend sensor which may be disposed on one surface of the display 110. As shown in FIG. 3B, a bend sensor 21 may be arranged in the front surface of the display 110 in a circular form. However, this is merely an example and the bend sensor may be arranged in the rear surface of the display 110 and may be implemented in a form of a looped curve forming various polygons such as a quadrangle.

FIG. 3C illustrates two bend sensors which intersect. Referring to FIG. 3C, a first bend sensor 22 may be disposed on a first surface of the display 110 in a first diagonal direction, and a second bend sensor 23 may be disposed on a second surface of the display 110 in a second diagonal direction.

Although line type bend sensors are used in the above-described various exemplary embodiments, the sensor 120 may sense bending using a plurality of strain gages.

Figure 3D:
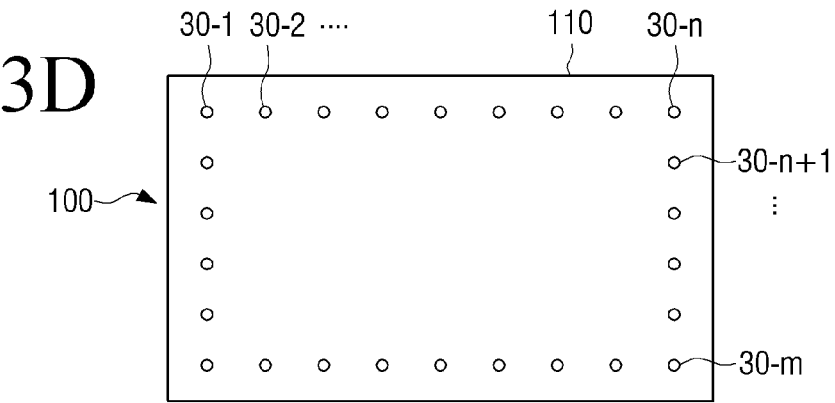

FIG. 3D illustrates a plurality of strain gages which are arranged in the display 110. The strain gage uses metal or a semiconductor in which a resistance is greatly changed according to an applied force, and senses deformation of a surface of an object to be measured according to a change in the resistance value. It is common that a material such as metal increases a resistance value when its length is stretched by an external force, and decreases the resistance value if the length is contracted. Accordingly, bending may be sensed by sensing a change in the resistance value.

Referring to FIG. 3D, a plurality of strain gages 30-1, 30-2, . . . , 30-n, . . . , 30-m, . . . ) are arranged along an edge of the display 110. The number of strain gages may be changed according to a size or a shape of the display 110, or sensing of predetermined bending, and a resolution, etc.

Hereinafter, a method for the sensor 120 to sense bending of the display 110 using bend sensors which are arranged in a grid formation or strain gages will be explained.

The bend sensor may be implemented in the form of an electric resistance sensor which uses an electric resistance, or a micro optical fiber sensor which uses a strain of an optical fiber. Hereinafter, the bend sensor will be explained with the assumption that the bend sensor may be the electric resistance sensor for the convenience of explanation.

Figure 4A:
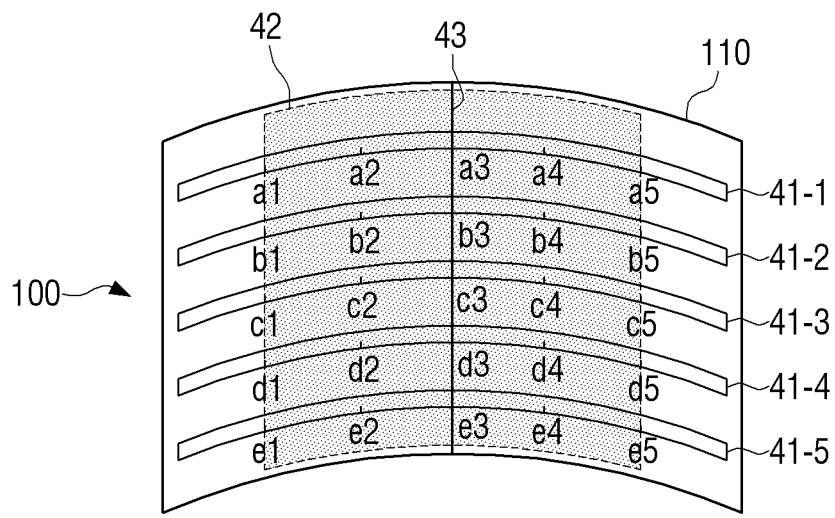
Figure 4B:
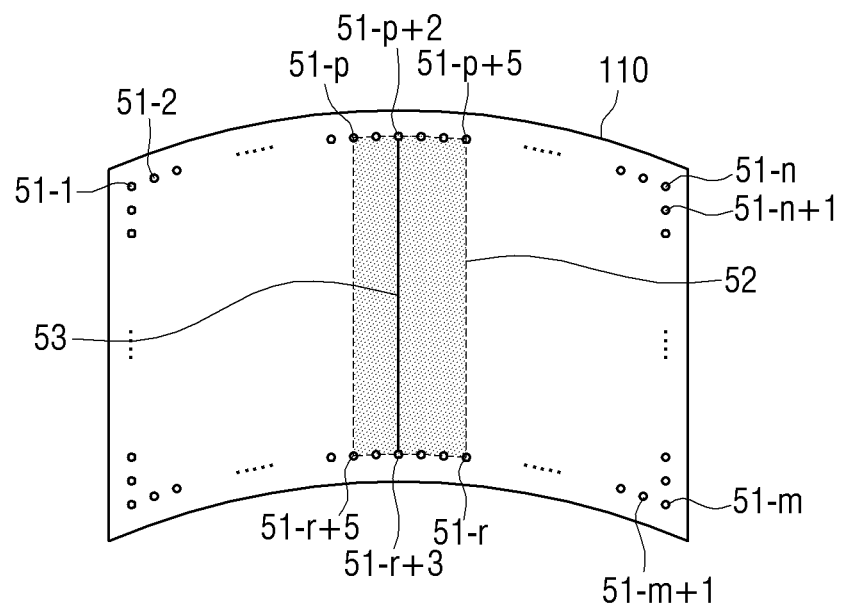

FIGS. 4A and 4B are views illustrating a method for sensing bending of the flexible display apparatus according to an exemplary embodiment.

When the display 110 is bent, the bend sensors, which are arranged on one surface or opposite surfaces of the display 110, are also bent and output resistance values corresponding to a magnitude of exerted tension.

That is, the sensor 120 may sense a resistance value of the bend sensor using a level of a voltage applied to the bend sensor or an intensity of a current flowing in the bend sensor, and may sense bending of the display 110 using the sensed resistance value.

For instance, when the display 110 is bent in a horizontal direction as shown in FIG. 4A, bend sensors 41-1 to 41-5 which are embedded in the front surface of the display 110 are also bent and output a resistance value according to a magnitude of exerted tension.

In this case, the magnitude of the tension increases in proportion to a degree of bending. For example, when the display 110 is bent as shown in FIG. 4A, the greatest bending occurs in the center area. Accordingly, the greatest tension is exerted to a point a3 of the bend sensor 41-1, a point b3 of the bend sensor 41-2, a point c3 of the bend sensor 41-3, a point d3 of the bend sensor 41-4, and a point e3 of the bend sensor 41-5, which are the center area, and accordingly, the bend sensors 41-1 to 41-5 have the greatest resistance value at the points a3, b3, c3, d3, and e3.

On the other hand, the degree of bending gradually decreases toward the outside. Accordingly, the bend sensor 41-1 has smaller resistance values as it goes away from the point a3 to the right and left, and has the same resistance value as that before the bending occurs at the point a1 and a left area of the point a1 and at the point a5 and a right area of the point a5 where bending does not occur. The same may be applied to the other bend sensors 41-2 to 41-5.

The controller 140 may determine bending of the display 110 based on a result of sensing by the sensor 120. Specifically, the controller 130 may determine a location of a bending area, a size of a bending area, a number of bending areas, a size of a bending line, a location of a bending line, a number of bending lines, a direction of a bending line, and a number of times that bending occurs, based on a relationship between points where a change in the resistance value of the bend sensor may be sensed.

A bending area may be an area in which the display 110 is bent. Because the bend sensor is also bent when the flexible display apparatus 100 is bent, all points at which the bend sensors output different resistance values from originals values may delineate a bending area. On the other hand, an area that has no change in the resistance value may delineate a flat area in which bending may be not performed, Accordingly, when a distance between the points at which the change in the resistance value is sensed lies within a predetermined distance, the points are sensed as one bending area. On the other hand, when the distance between the points at which the change in the resistance value is sensed lies beyond the predetermined distance, different bending areas are delineated with reference to these points.

As described above, in FIG. 4A, the resistance values from the points a1 to a5 of the bend sensor 41-1, from the points b1 to b5 of the bend sensor 41-2, from the points c1 to c5 of the bend sensor 41-3, from the points d1 to d5 of the bend sensor 41-4, and from the points e1 to e5 of the bend sensor 41-5 are different from the resistance values of the original state. In this case, the points at which the change in the resistance value is sensed in each bend sensor 41-1 to 41-5 are located within a predetermined distance and are continuously arranged.

Accordingly, the controller 130 determines an area 42 which includes all of the points, from the points a1 to a5 of the bend sensor 41-1, from the points b1 to b5 of the bend sensor 41-2, from the points c1 to c5 of the bend sensor 41-3, from the points d1 to d5 of the bend sensor 41-4, and from the points e1 to e5 of the bend sensor 41-5, as one bend area.

The bending area may include a bending line. The bending line refers a line which connects the points at which the greatest resistance value is sensed in each bending area. Accordingly, the controller 130 may determine a line connecting points at which the greatest resistance value is sensed in the bending area as a bending line.

For instance, in the case of FIG. 4A, a line 43, which connects the point a3 at which the greatest resistance value is output in the bend sensor 41-1, the point b3 at which the greatest resistance value is output in the bend sensor 41-2, the point c3 at which the greatest resistance value is output in the bend sensor 41-3, the point d3 at which the greatest resistance value is output in the bend sensor 41-4, and the point e3 at which the greatest resistance value is output in the bend sensor 41-5, may delineate a bending line. FIG. 4A illustrates the bending line which may be formed in the center area of the display surface in the vertical direction.

FIG. 4A illustrates only the bend sensors that are arranged in the horizontal direction from among the bend sensors arranged in the grid formation to explain the case in which the display 110 may be bent in the horizontal direction. That is, the sensor 120 may sense bending of the display 110 in the vertical direction through the bend sensors which are arranged in the vertical direction in the same method as the method for sensing bending in the horizontal direction. Also, when the display 110 may be bent in the diagonal direction, tension is exerted to all of the bend sensors which are arranged in the horizontal and vertical directions. Therefore, the sensor 120 may sense bending of the display 110 in the diagonal direction based on outputs values of the bend sensors arranged in the horizontal and vertical directions.

Also, the sensor 120 may sense bending of the display 110 using a strain gage.

Specifically, when the display 110 is bent, a force may be applied to strain gages which are arranged along an edge of the display 110, and the strain gages output different resistance values according to the applied force. Accordingly, the controller 130 may determine a location of a bending area, a size of a bending area, a number of bending areas, a size of a bending line, a location of a bending line, a number of bending lines, a direction of a bending line, and a number of times that bending occurs, based on output values of the strain gages.

For example, when the display 110 is bent in the horizontal direction as shown in FIG. 4B, a force may be applied to strain gages 51-$p$, . . . , 51-$p$+5, 51-$r$, . . . , 51-$r$+5 that are arranged around a bent area from among a plurality of strain gages embedded in the front surface of the display 110, and the strain gages 51-$p$, . . . , 51-$p$+5, 51-$r$, . . . , 51-$r$+5 output resistance values corresponding to the applied force. Accordingly, the controller 130 may determine an area 52 that includes all points where the strain gages output resistance values different from those of the original state, as one bending area.

Also, the controller 130 may determine a line connecting at least two strain gages that output resistance values greatly different from those of the original state in the bending area as a bending line. That is, the controller 130 may determine a line connecting at least two strain gages to which the greatest force is applied, or at least two strain gages to which the greatest force and the next greatest force are applied as a bending line according to the bending of the display 110.

For example, when the display 110 is bent in the horizontal direction as shown in FIG. 4B, the display 110 may determine a line connecting the first strain gage 51-$p$+2 and the second strain gage 51-$r$+3 that output resistance values greatly different from those of the original state as a bending line.

In the above-described exemplary embodiment, the strain gages 51-1, 51-2, . . . are embedded in the front surface of the display 110. The strain gages 51-1, 51-2, . . . are embedded in the front surface of the display 110 to sense bending when the display 110 is bent in a Z+ direction.

A bending direction of the flexible display apparatus 100 may be defined according to a direction in which a convex area of the display 110 points. That is, with the assumption that the front surface of the display 110 is a two-dimensional x-y plane, when the convex area of the bent display 110 points a z– direction of a z-axis which is perpendicular to the x-y plane, the bending direction of the display 110 is a Z+ direction, and, when the convex area of the bent display 110 points a z+ direction of the z-axis, the bending direction of the display 110 may be a Z– direction.

Therefore, the strain gages may be embedded in the rear surface of the display 110 to sense bending of the display 110 in the Z– direction. However, this is merely an example and the strain gages may be disposed in one surface of the display 110 to sense bending in the Z+ direction and the Z– direction.

The sensor 120 may sense a degree of bending of the display 110, that is, a bending angle. The bending angle recited herein may refer to an angle which may be formed when the display 110 is bent in comparison with a flat state of the display 110.

Figure 5:
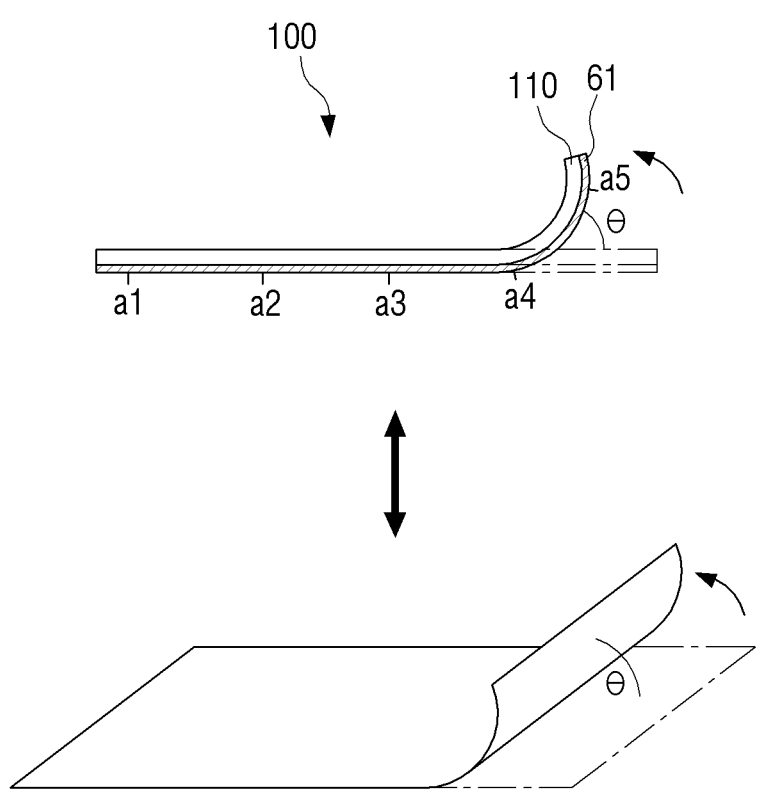

FIG. 5 is a view to illustrate a method for determining a bending angle of the display of the flexible display apparatus according to an exemplary embodiment.

The controller 130 may determine a bending angle of the display 110 based on a result of sensing by the sensor 120. To achieve this, the flexible display apparatus 100 may pre-store resistance values which are output from a bending line according to a bending angle of the display 110. Accordingly, the controller 130 may compare a resistance value which may be output from a bend sensor or strain gage disposed in the bending line when the display 110 may be bent, with the pre-stored resistance values, and may determine a bending angle of the display 110.

For example, when the display 110 is bent as shown in FIG. 5, a bend sensor point a4 located in a bending line outputs the greatest resistance value. At this time, the flexible display apparatus 100 determines a bending angle ($\theta$) that matches the resistance value output from the point a4 using the resistance values which are pre-stored according to the bending angles.

As described above, the bending direction of the display 110 may be divided into the Z+ direction and the Z– direction, and the sensor 120 may sense the bending direction of the display 110 in various ways. A detailed description of this will be provided with reference to FIGS. 6 and 7.

Figure 6A:
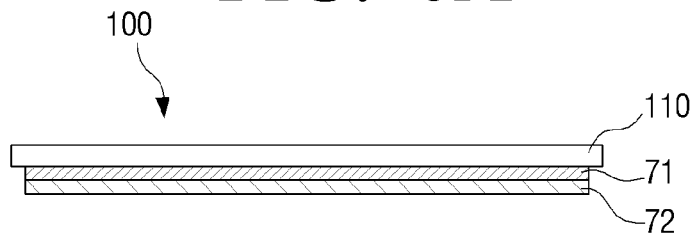
FIGS. 6A through 6C are views illustrating a method for sensing a bending direction using overlapping bend sensors according to an exemplary embodiment.
Figure 6B:
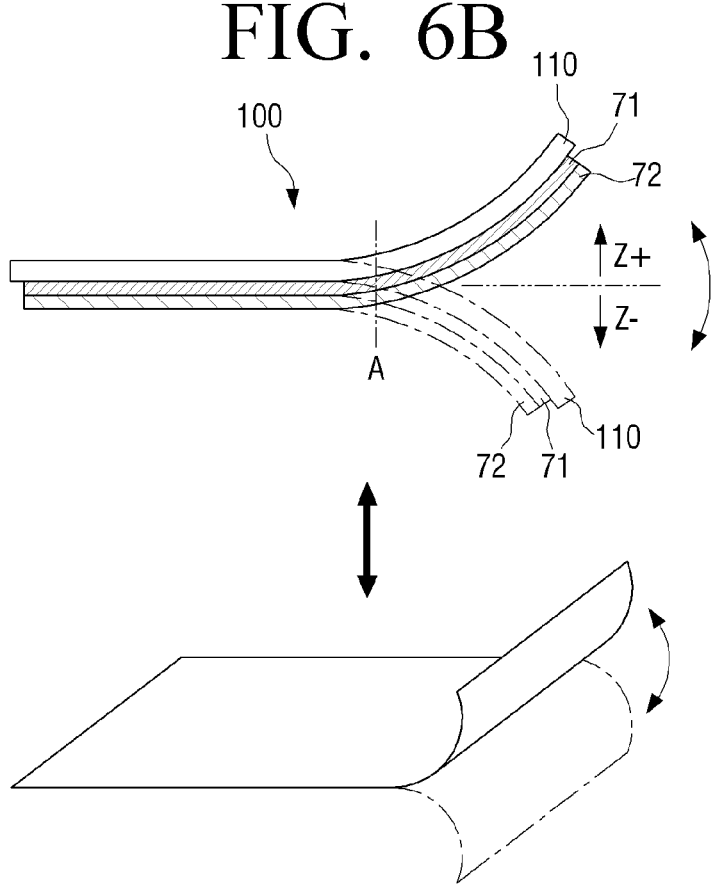
Figure 6C:
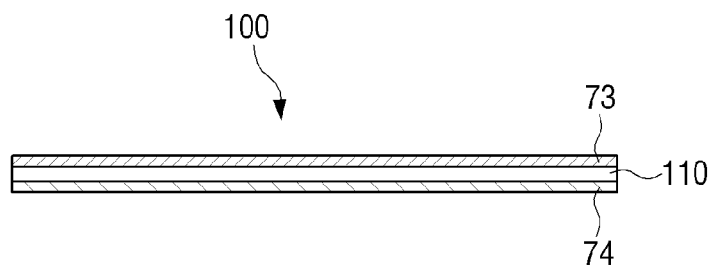

FIGS. 6A through 6C are views illustrating a method for sensing a bending direction using overlapping bend sensors according to an exemplary embodiment.

The controller 130 may determine a bending direction of the display 110 based on a result of sensing by the sensor 120. To achieve this, the sensor 120 may include a bend sensor which may be disposed in various ways.

For example, the sensor 120 may include two bend sensors 71 and 72 which are disposed overlapping each other on one side of the display 110 as shown in FIG. 6A. In this case, when bending is performed in one direction, different resistance values are output from the upper bend sensor 71 and the lower bend sensor 72 at a point where the bending is performed. Accordingly, the controller 130 may determine a bending direction by comparing the resistance values of the two bend sensors 71 and 72 at the same point.

Specifically, when the display 110 is bent in the Z+ direction as shown in FIG. 6B, tension exerted to the lower bend sensor 72 may be greater than that of the upper bend sensor 71 at a point 'A' corresponding to a bending line. On the other hand, when the display 110 is bent in the Z− direction, tension exerted to the upper bend sensor 71 may be greater than that of the lower bend sensor 72.

Accordingly, the controller 130 may determine the bending direction by comparing the resistance values of the two bend sensors 71 and 72 at the point A. That is, the controller 130 may determine that the display 110 is bent in the Z+ direction when the resistance value output from the lower bend sensor of the two overlapping bend sensors may be greater than the resistance value output from the upper bend sensor at the same point. The controller 130 may determine that the display 110 is bent in the Z− direction when the resistance value output from the upper bend sensor of the two overlapping bend sensors may be greater than the resistance value output from the lower bend sensor at the same point.

Although the two bend sensors are disposed overlapping each other on one side of the display 110 in FIGS. 6A and 6B, the sensor 120 may include bend sensors which are disposed on opposite surfaces of the display 110 as shown in FIG. 6C.

FIG. 6C illustrates two bend sensors 73 and 74 which are disposed on the opposite surfaces of the display 110.

Accordingly, when the display 110 is bent in the Z+ direction, the bend sensor which is disposed on a first surface of the opposite surfaces of the display 110 may be subject to a compressive force, whereas the bend sensor which is disposed on a second surface is subject to tension. On the other hand, when the display 110 is bent in the Z− direction, the bend sensor disposed on the second surface may be subject to a compressive force, whereas the bend sensor disposed on the first surface may be subject to tension. As described above, the different values are detected from the two bend sensors according to the bending direction and the controller 130 distinguishes the bending directions according to a detection characteristic of the value.

Although the bending direction may be sensed using the two bend sensors in FIGS. 6A through 6C, the bending directions may be distinguished by means of only a strain gage disposed on one surface or opposite surfaces of the display 110.

Figure 7A:
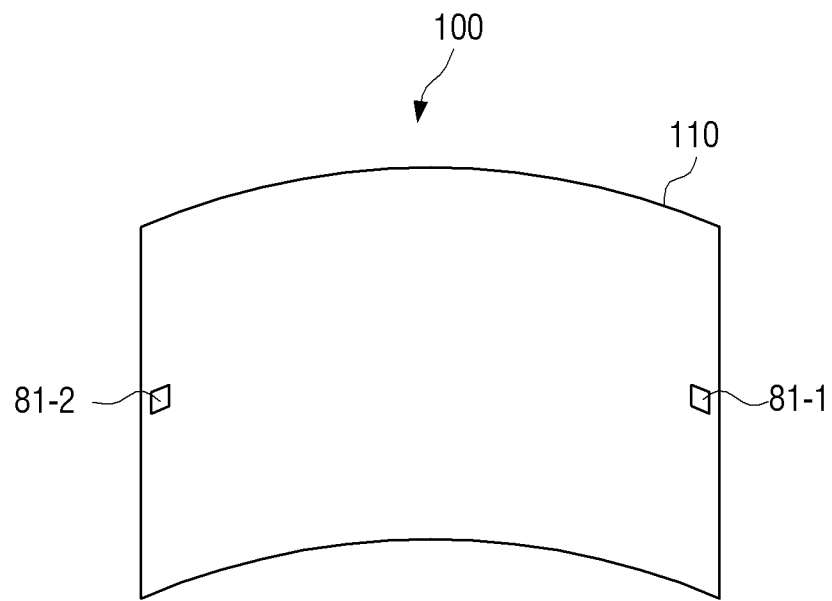
FIGS. 7A and 7B are views illustrating a method for sensing a bending direction according to another exemplary embodiment.
Figure 7B:
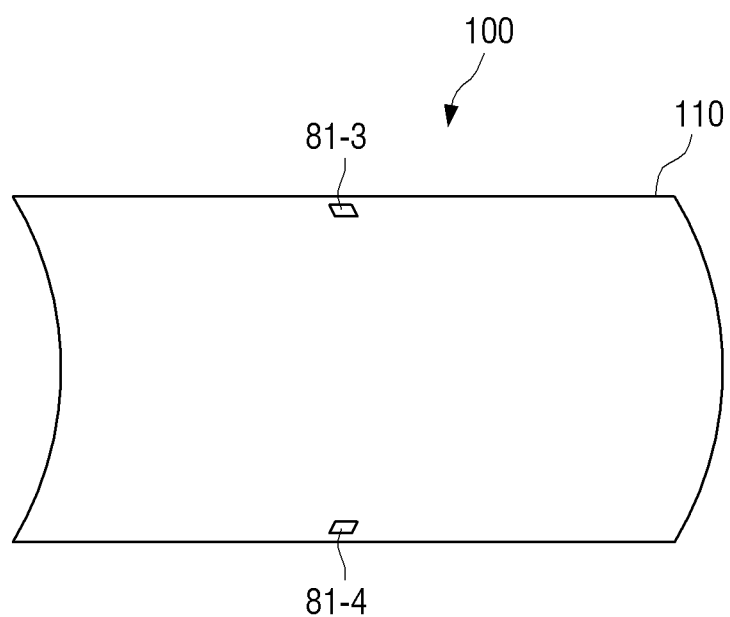

FIGS. 7A and 7B are views illustrating a method for sensing a bending direction according to another exemplary embodiment. Specifically, FIGS. 7A and 7B are views illustrating a method for sensing a bending direction using an acceleration sensor for example.

The sensor 120 may include a plurality of acceleration sensors which are disposed on edge areas of the display 110. The controller 130 may determine a bending direction of the display 110 based on a result of sensing by the sensor 120.

The acceleration sensor is a sensor that measures acceleration of a motion and a direction of the acceleration. Specifically, the acceleration sensor outputs a sensing value corresponding to acceleration of gravity which changes according to a slope of an apparatus where that sensor is attached.

Accordingly, when the acceleration sensors 81-1 and 81-2 are disposed on opposite edges of the display 110 as shown in FIG. 7A, output values sensed by the acceleration sensors 81-1 and 81-2 are changed when the display 110 is bent. The controller 130 calculates a pitch angle and a roll angle using the output values sensed by the acceleration sensors 81-1 and 81-2. Accordingly, the controller 130 may determine a bending direction based on changes in the pitch angle and the roll angle sensed by the acceleration sensors 81-1 and 81-2.

In FIG. 7A, the acceleration sensors 81-1 and 81-2 are disposed on opposite edges in the horizontal direction with reference to the front surface of the display 110. However, the acceleration sensors may be disposed in the vertical direction as shown in FIG. 7B. In this case, when the display 110 is bent in the vertical direction, the controller 130 may determine a bending direction according to measurement values sensed by the acceleration sensors 81-3 and 81-4 in the vertical direction.

In FIGS. 7A and 7B, the acceleration sensors are disposed on the left and right edges or the upper and lower edges of the display 110. However, the acceleration sensors may be disposed all of the left, right, upper and right edges or may be disposed on corners.

The bending direction may be sensed using a gyro sensor or a geomagnetic sensor besides the acceleration sensor described above. The gyro sensor refers to a sensor which, when a rotational motion occurs, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor which senses azimuth using a 2-axis or 3-axis fluxgate. When such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bending characteristics such as a bending area and a bending direction can be determined.

As described above, the controller 130 may determine bending of the display 110 based on a result of sensing by the sensor 120. The configuration of the sensor and the sensing method described above may be applied to the flexible display apparatus 100 individually or may be applied in combination.

In the above-described exemplary embodiment, the display 110 is bent. However, because the display 110 is bent along with the flexible display apparatus 100, sensing bending of the display 110 may be regarded as sensing bending of the flexible display apparatus 100. That is, the configuration to sense bending may be provided in the flexible display apparatus 100, and the controller 130 may determine bending of the flexible display apparatus 100 based on a result of sensing.

The sensor 120 may sense a user's touch manipulation on a screen of the display 110. In this case, the sensor 120 may include a resistive or capacitive touch sensor, and the controller 130 may determine coordinates of a point of the display 110 where the user touches based on an electric signal transmitted from the sensor 120.

The controller 130 controls an overall operation of the flexible display apparatus 100. In particular, the controller 130 may determine bending of the display 110 based on a result of sensing by the sensor 120. Specifically, the controller 130 may determine bending/unbending of the display 110, a location of a bending area, a size of a bending area, a number of bending areas, a size of a bending line, a location of a bending line, a number of bending lines, a bending direction, a bending angle, and a number of times that bending occurs, using a resistance value which may be output from a bend sensor or a strain gage. This has been described above with reference to FIGS. 3 to 7 and a redundant explanation thereof is omitted.

The sensor 120 may sense a user grip on the display 110. The user grip recited herein may refer to an operation of gripping the display 110 with user's one hand or both hands.

The sensor 120 senses a magnitude of pressure exerted to the display 110 and provides the magnitude of pressure to the controller 130. The controller 130 may determine whether the user grips the display 110 or not based on a result of sensing by the sensor 120. The sensing the pressure exerted to the display 110 may be regarded as sensing pressure exerted to the screen of the display 110.

For example, the sensor 120 may include a piezo film which outputs an electric signal corresponding to the magnitude of exerted pressure. In this case, when pressure greater than a predetermined level is exerted to the display 110, the controller 130 may determine that the user grips the display 110, and may recognize a user grip point and a number of areas where the user grip is performed using coordinates of the piezo film to which an electric signal may be transmitted.

Also, although the user grip exerted to the display 110 may be sensed in the above-described exemplary embodiment, this is merely an example. That is, the sensor 120 may sense pressure exerted to the flexible display apparatus 100 besides the display 110, and the controller 130 may determine whether the user grips the flexible display apparatus 100 or not based on a result of sensing by the sensor 120. The sensing the pressure exerted to the flexible display apparatus 100 may be regarded as sensing an edge area of the display 110 such as a bezel and sensing an area other than the display 100.

In this case, the sensor 120 may sense the magnitude of pressure exerted to the flexible display apparatus 100 using the piezo film, and the controller 130 may recognize a user grip point and a number of areas where the user grip may be performed using the magnitude of pressure and coordinates of the piezo film.

According to an exemplary embodiment, the user grip may be determined in various methods. For example, the sensor 120 may include a resistive or capacitive touch sensor to sense a touch on the screen of the display 110. In this case, when the touch may be performed on the display 110 for more than a predetermined time, the controller 130 may determine that the user grip is performed on the display 110, and may recognize a user grip point and a number of areas were the user grip is performed using coordinates of the touch point.

The controller 130 performs an operation corresponding to a user manipulation which is sensed by the sensor 120. In particular, when shape deformation in which the display 110 is bent in opposing directions alternately is sensed within a predetermined time, the controller 130 performs an operation corresponding to the sensed shape deformation. The predetermined time may be set and changed by the user. For example, the user may set the predetermined time using a separate button (for example, a time setting button) or a separate menu displayed on the flexible display apparatus 100.

Hereinafter, the shape deformation in which the display 110 is bent in opposing directions alternately will be explained in detail with reference to FIG. 8.

Figure 8A:
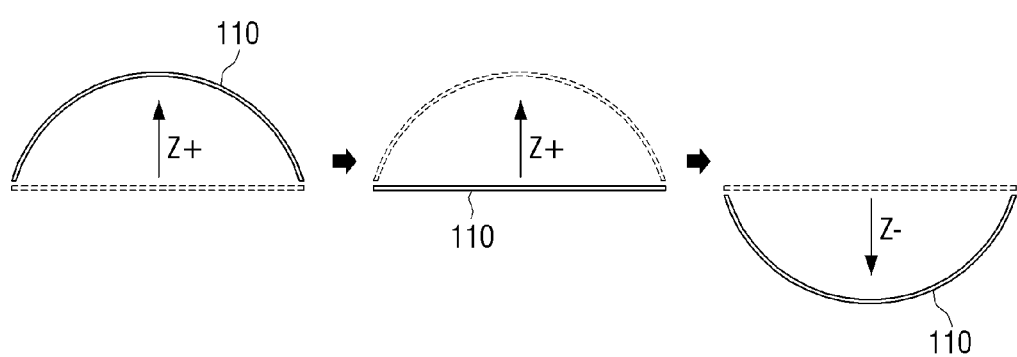
FIGS. 8A and 8B are views illustrating shape deformation in which a display is bent in opposing directions alternately according to an exemplary embodiment.
Figure 8B:
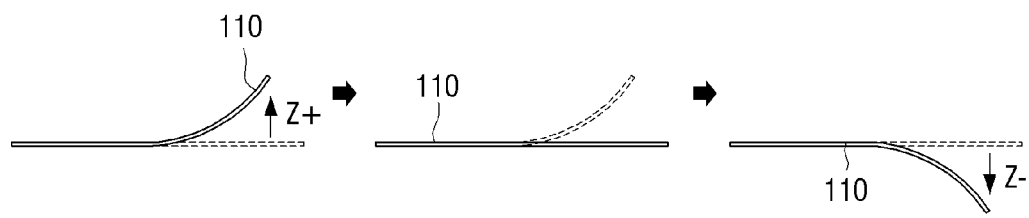

FIGS. 8A and 8B are views illustrating shape deformation in which the display is bent in opposing directions alternately according to an exemplary embodiment.

FIGS. 8A and 8B are cross section views of the display 110. It can be seen from FIGS. 8A and 8B that the display 110 which has been bent in the Z+ direction returns to its flat state and continuously is bent in the Z− direction from the flat state.

As described above, when shape deformation in which the display 110 which has been bent in one direction returns to the original state and then is continuously bent in the other direction is repeated at least one time, it may be determined that the shape deformation in which the display 110 is bent in opposing directions alternately is performed. On the other hand, in FIGS. 8A and 8B, the display 110 is bent in the Z+ direction and then is bent in the Z− direction. However, this is merely an example and the display 110 may be bent in the Z− direction and then may be bent in the Z+ direction.

On the other hand, when the display 110 is bent in opposing directions alternately, the controller 130 may determine that a shaking manipulation or a swinging manipulation is performed. Hereinafter, the swinging manipulation and the shaking manipulation will be explained in detail with reference to FIGS. 9 and 10.

Figure 9:
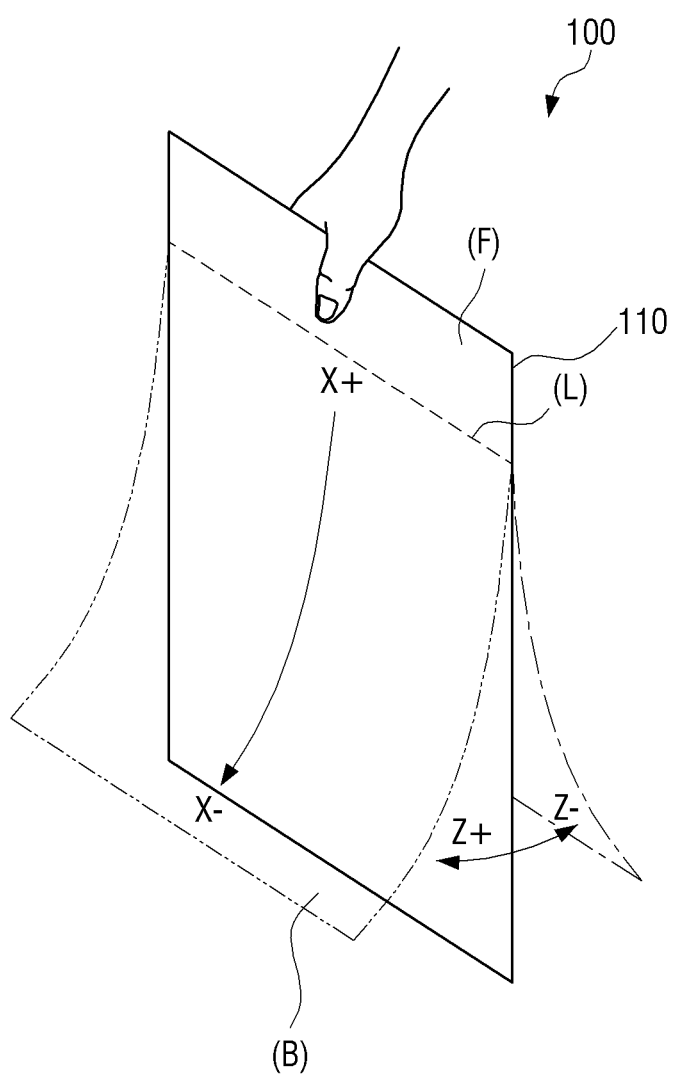
FIG. 9 is a view illustrating a shaking manipulation according to an exemplary embodiment.

FIG. 9 is a view to illustrate a shaking manipulation according to an exemplary embodiment.

The shaking manipulation refers to an operation of holding one edge of the display 110 or the flexible display apparatus 100 and shaking the display 110 or the flexible display apparatus 100. For example, when the user grips one edge of the display 110 and shakes the display 110 backwards and forwards as shown in FIG. 9, the display 110 is bent in the Z+ direction and the Z− direction alternately. The area gripped by the user maintains a flat state (F) and the other area formed with reference to a boundary line (L) is bent and forms a bending area (B). As shown in FIG. 9, the direction of the area gripped by the user may be defined as an X+ direction and the other direction may be defined as an X− direction.

Figure 10A:
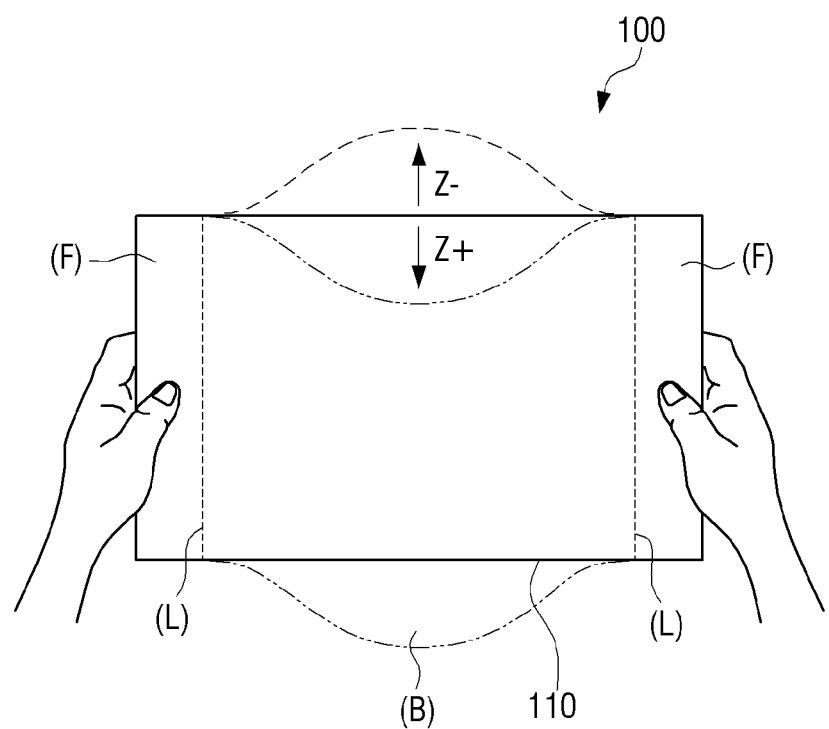
FIGS. 10A and 10B is a view illustrating a swinging manipulation according to an exemplary embodiment.
Figure 10B:
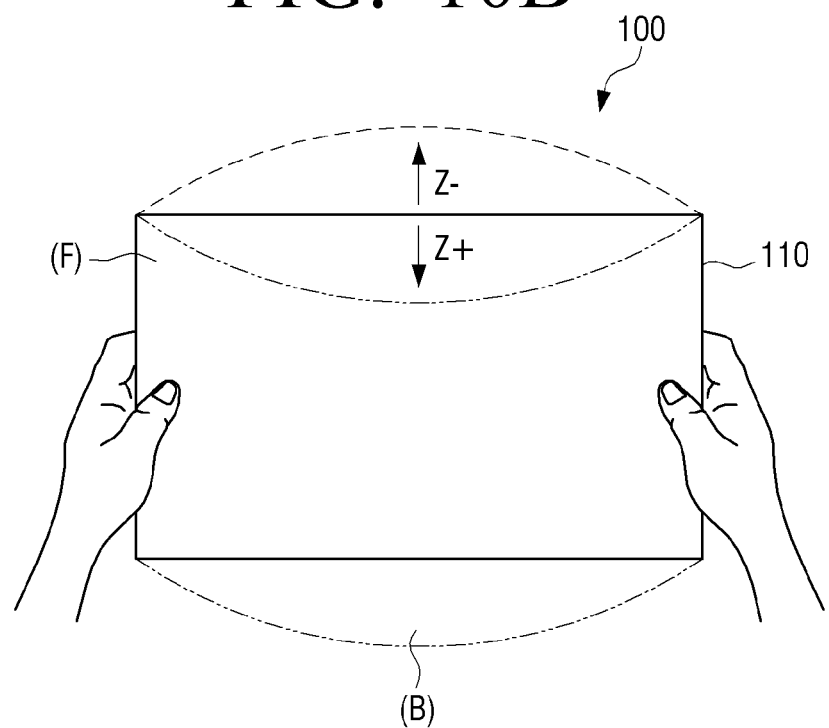

FIGS. 10A and 10B are views illustrating a swinging manipulation according to an exemplary embodiment.

The swinging manipulation refers to an operation of holding opposite edges of the display 110 or the flexible display apparatus 100 and swinging the display 110 or the flexible display apparatus 100.

For example, referring to FIGS. 10A and 10B, when the user grips the display 110 with his/her both hands and swings it backwards and forwards, the display 110 is bent in the Z+ direction and the Z− direction alternately. At this time, the area gripped by the user maintains a flat state (F) and the other area formed with reference to a boundary line (L) is bent and forms a bending area (B), as shown in FIG. 10A. Also, the whole area of the display 110 may be bent without a flat area and may form the bending area (B) as shown in FIG. 10B.

On the other hand, the controller 130 may determine whether the shaking manipulation or the swinging manipulation is input or not using various methods.

For example, when the user grip is sensed on one edge of the display 110 and shape deformation in which the display 110 is bent in opposing directions alternately is performed, the controller 130 may determine that the shaking manipulation is performed.

Also, when the user grip is sensed on opposite edges of the display 110 and shape deformation in which the display 110 is bent in opposing directions alternately is performed, the controller 130 may determine that the swinging manipulation is performed.

For example, the controller 130 determines whether pressure applied when the user grips the display 110 is exerted to one edge or opposite edges of the display 110, using coordinates of the piezo film which outputs electric signals.

When the pressure is exerted to one edge and the display 110 is bent in opposing directions alternately, the controller 130 determines that the shaking manipulation is performed, and, when the pressure is exerted to opposite edges and the display 110 is bent in opposing directions alternately, the controller 130 determines that the swinging manipulation is performed. In this case, the controller 130 may determine whether the display 110 is bent in opposing directions alternately or not using an output value of the bend sensor or the acceleration sensor.

At this time, even when the user grips one edge of the display 110 with his/her both hands rather than one hand and shakes it, it may be determined that a shaking manipulation is performed. Therefore, even when the user grip is performed on two or more areas of one edge, it may be determined that a shaking manipulation is performed when the display 110 is bent in opposing directions alternately.

In the above-described exemplary embodiment, it is determined whether the swinging manipulation or the shaking manipulation is performed based on the user grip of the display 110. However, this is merely an example. That is, the controller 130 may determine where the user grip is performed based on pressure exerted to the flexible display apparatus 100 rather than the display 110, and may determine whether the swinging manipulation or the shaking manipulation is performed on the flexible display apparatus 100.

Specifically, when the user grip is sensed on one edge of the flexible display apparatus 100 and shape deformation in which the flexible display apparatus 100 is bent in opposing directions alternately is performed, the controller 130 may determine that the shaking manipulation is performed. Also, when the user grip is sensed on opposite edges of the flexible display apparatus 100 and shape deformation in which the flexible display apparatus 100 is bent in opposing directions alternately is performed, the controller 130 may determine that the swinging manipulation is performed.

In the above-described exemplary embodiment, it is determined whether the user grip is performed or not on the display 110 based on the pressure. However, this is merely an example. That is, the controller 130 may determine where the user grip is performed based on a touch on the display 110 and may determine whether the swinging manipulation or the shaking manipulation is performed.

On the other hand, the controller 130 may determine whether the shaking manipulation or the swinging manipulation is performed using the acceleration sensor.

Figure 11A:
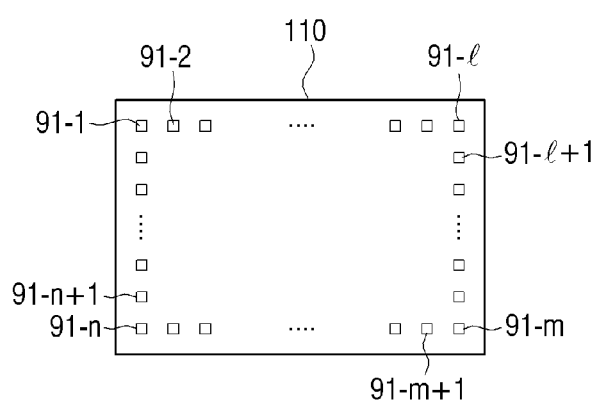
FIGS. 11A through 12B are views illustrating a method for determining a shaking manipulation and a swinging manipulation according to an exemplary embodiment.
Figure 11B:
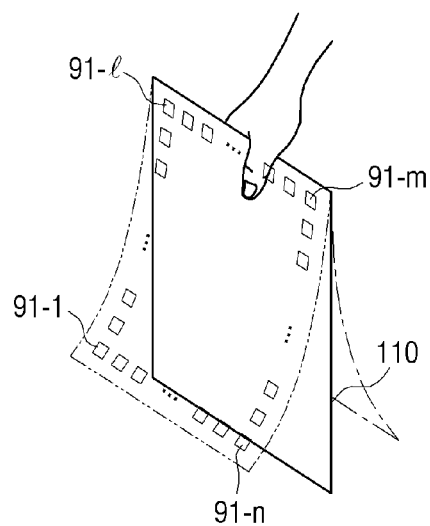
Figure 11C:
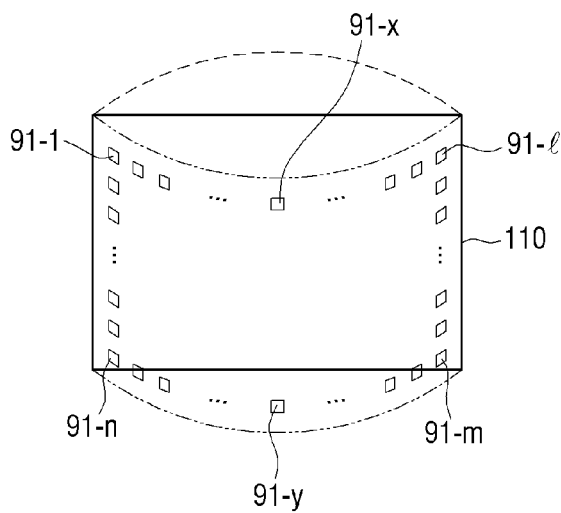

For example, it is assumed that the sensor 120 includes acceleration sensors 91-1, 91-2, ..., 91-$l$, 91-$l$+1, ..., 91-$m$, 91-$m$+1, ..., 91-$n$, 91-$n$+1 which are arranged along all edges of the display 110 at predetermined intervals, as shown in FIGS. 11A through 11C. In this case, the controller 130 may determine whether the shaking manipulation or the swinging manipulation is performed using a change in the output value sensed by each acceleration sensor.

Specifically, when the display 110 is bent in the Z+ direction, the acceleration sensors 91-$l$, 91-$l$+1, ..., 91-$m$ which are arranged along one edge of the display 110 output acceleration values close to zero, and the acceleration values become greater toward the opposite edge from the acceleration sensors 91-$l$, ..., 91-$l$–1, 91-$m$+1, ..., 91-$n$. On the other hand, when the display 110 is bent in the Z– direction, sensing values similar to those in the Z+ direction, but having the opposite direction are output. When the sensor 120 outputs sensing values similar to those described above, the controller 130 determines that the shaking manipulation is performed.

On the other hand, when the display 110 is bent in the Z+ direction, the greatest acceleration value is output from the acceleration sensors 91-$x$ and 91-$y$ which are disposed at the center of the edge of the display 110, and the acceleration values become smaller toward the acceleration sensors 91-$l$, ..., 91-$x$–1, 91-$x$+1, ..., 91-$l$, 91-$n$, ..., 91-$y$–1, 91-$y$+1, ..., 91-$m$ which are arranged in opposite edge directions from the center acceleration sensors. On the other hand, when the display 110 is bent in the Z– direction, sensing values similar to those in the Z+ direction but having the opposite direction are output. When the sensor 120 outputs sensing values similar to those described above, the controller 130 determines that the swinging manipulation is performed.

Although the acceleration sensors are arranged on all areas of the display 110 at regular intervals in the above-described exemplary embodiment, this is merely an example. That is, one acceleration sensor may be disposed at the center of each side of the display 110, and the controller 130 may determine whether the shaking manipulation or the swinging manipulation is performed based on an output value of the acceleration sensor disposed at the center of each side.

That is, when the acceleration sensor disposed at the center of one side of the display 110 outputs the greatest acceleration value and the acceleration value similar to this value but having the opposite direction is output, the controller 130 may determine that the shaking manipulation is performed. When the acceleration sensors disposed at the center areas of the opposite sides of the display 110 output the greatest acceleration value and the acceleration value similar to this value but having the opposite direction is output, the controller 130 may determine that the swinging manipulation is performed.

Also, the controller 130 may determine whether the shaking manipulation or the swinging manipulation is performed using the bending sensor and the acceleration sensor.

Figure 12A:
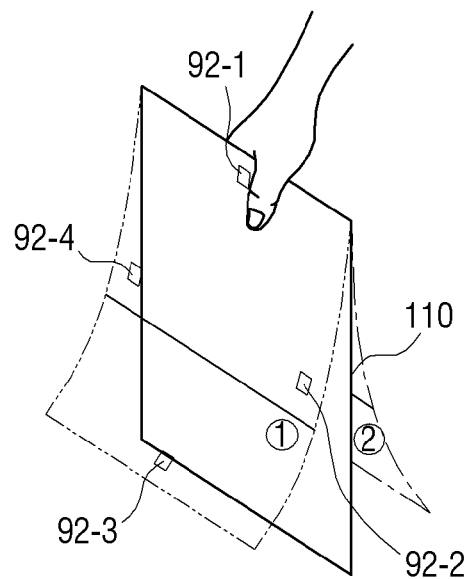

For example, when the display 110 is continuously bent in the Z+ direction and the Z– direction as shown in FIG. 12A, an acceleration sensor 92-3 which is disposed at one edge of the display 110 outputs the greatest acceleration value.

In this case, the controller 130 may determine whether the shaking manipulation is performed or not by additionally considering a location of a bending line. For example, when the bending line ① which is formed when the display 110 is bent in the Z+ direction and the bending line ② which is formed when the display 110 is bent in the Z– direction are located within a predetermined distance from those in the flat state, the controller 130 may determine that the shaking manipulation is performed.

Figure 12B:
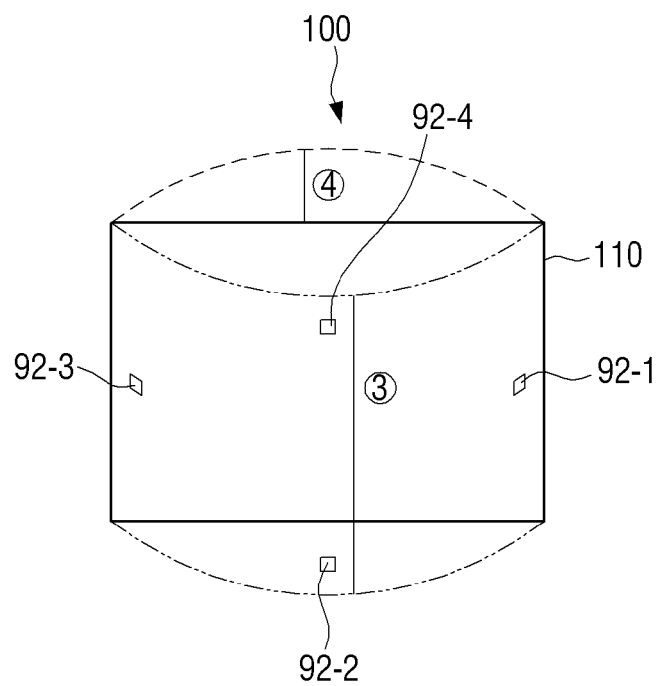

Also, when the display 110 is continuously bent in the Z+ direction and the Z– direction as shown in FIG. 12B, acceleration sensors 92-2 and 92-4 which are disposed at centers of the two opposite sides of the display 110 output the greatest acceleration values.

In this case, the controller 130 may determine whether the swinging manipulation is performed or not by additionally considering a location of a bending line. For example, when the bending line ③ which is formed when the display 110 is bent in the Z+ direction and the bending line ④ which is formed when the display 110 is bent in the Z– direction are located within a predetermined distance from those in the flat state, the controller 130 may determine that the swinging manipulation is performed.

In the above-described exemplary embodiment, the direction in which the display 110 is bent is determined using the acceleration sensors. However, this is merely an example. That is, the controller 130 may determine the bending direction using various sensors such as bend sensors and geomagnetic sensors. The determining the bending direction using the bend sensors and the geomagnetic sensors has been described above and thus a redundant explanation is omitted.

Also, although the acceleration sensors are arranged in the display 110 in the above-described exemplary embodiment, this is merely an example. That is, the acceleration sensors may be arranged in the flexible display apparatus 100 and the controller 130 may determine whether the shaking manipulation or the swinging manipulation is performed in the flexible display apparatus 100 based on a result of sensing.

Also, the controller 130 may determine whether the shaking manipulation or the swinging manipulation is performed using the bend sensors.

That is, when the shaking manipulation is performed, the degree of bending increases from one edge to the other edge of the display 110. Therefore, when the display 110 is bent in opposing directions alternately and the resistance values output from the bend sensors increase from one edge to the other edge of the display 110, the controller 130 may determine that the shaking manipulation is performed.

Also, when the swinging manipulation is performed, the degree of bending increases from the edges to the center of the display 110. Therefore, when the display 110 is bent in opposing directions alternately and the resistance values output from the bend sensors increase from the edges to the center of the display 110, the controller 130 may determine that the swinging manipulation is performed.

In these cases, the controller 130 may determine the bending direction using the bend sensors, the acceleration sensors, the geomagnetic sensors, and the gyro sensors.

Also, the controller 130 may determine whether the shaking manipulation or the swinging manipulation is performed based on a pattern of a bending line. To achieve this, the flexible display apparatus 100 may pre-store a pattern of a bending line that is formed when the shaking manipulation or the swinging manipulation is performed in the display 110. That is, the flexible display apparatus 100 may pre-store a location and a length of a bending line which are experimentally measured according to the shaking manipulation or the swinging manipulation.

Specifically, the controller 130 compares a location and a length of a bending line which is formed when the display 110 is bent alternately with a pre-stored pattern, and determines that the shaking manipulation is performed when the location and the length of the bending line match a pattern corresponding to the shaking manipulation, and determines that the swinging manipulation is performed when the location and the length of the bending line match a pattern corresponding to the swinging manipulation.

Hereinafter, an operation that is performed in the flexible display apparatus 100 when the shaking manipulation or the swinging manipulation is performed will be explained in detail.

<Operation Corresponding to Shaking Manipulation>

FIGS. 13 to 20 are views to illustrate an operation corresponding to a shaking manipulation according to an exemplary embodiment.

The controller 130 may perform various operations corresponding to the shaking manipulation according to an application which is installed in the flexible display apparatus 100 and executed.

First, a case in which a plurality of objects are displayed on the display 110 when an application is driven will be explained. The object recited herein may include all items that can be displayed on the display 110 such as icons, images, texts, and photos.

When the plurality of objects are displayed on the display 110 and the shaking manipulation is performed, the controller 130 may rearrange the plurality of objects according to a predetermined criterion and may display the objects on the display 110.

For example, when a plurality of images are displayed on the display 110 and the shaking manipulation is performed, the controller 130 may control to rearrange the plurality of images and display images including persons on the display 110. Also, when a plurality of images are displayed on the display 110 and the shaking manipulation is performed, the controller 130 may control to rearrange the plurality of images and display images related to specific places on the display 110.

On the other hand, when the images related to the persons are displayed on the display 110 according to the shaking manipulation and the shaking manipulation is performed again, the controller 130 may control to rearrange the plurality of images displayed on the display 110 and display images related to specific places on the display 110.

Likewise, when the images related to the specific places are displayed on the display 110 according to the shaking manipulation and the shaking manipulation is performed again, the controller 130 may control to rearrange the plurality of images displayed on the display 110 and display images including persons on the display 110.

Also, the controller 130 may control to display a different image on the display 110 according to a number of times that the shaking manipulation is performed. For example, when the shaking manipulation is performed one time, the controller 130 may control to rearrange the plurality of images displayed on the display 110 and display images including persons on the display 110, and, when the shaking manipulation is performed two times, the controller 130 may control to rearrange the plurality of images displayed on the display 110 and display images related to specific places on the display 110.

The controller 130 may analyze whether each image includes a person or not using face recognition technology. The controller 130 may analyze pixels of each image and detect a specific part of the person (for example, eye), thereby analyzing whether the image includes a person or not. Accordingly, the controller 130 may classify the images including the persons as images related to persons. The controller 130 may detect an image including information on a specific place (for example, a place name) from among the images that do not include a person with reference to metadata of each image, and may classify the detected image as an image related to a specific place. The controller 130 matches information on the images classified in this method with each image, and may store the information in the flexible display apparatus 100.

Figure 13:
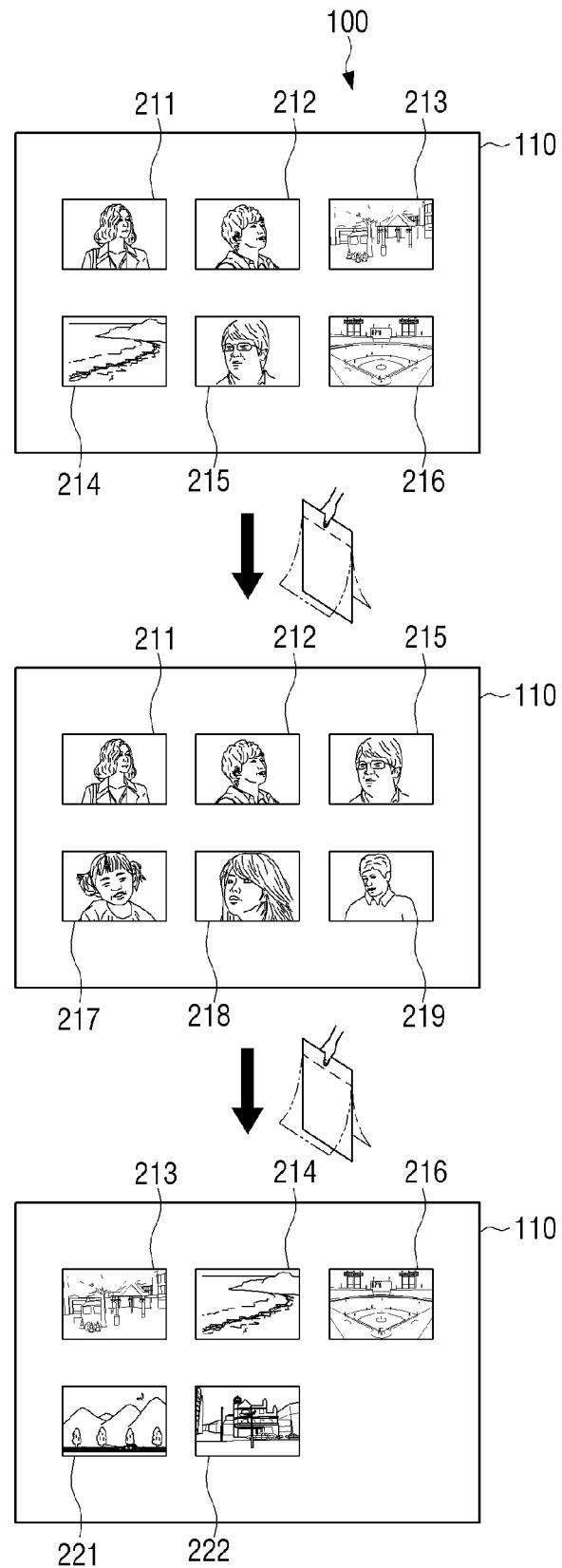
FIGS. 13 through 20 are views illustrating an operation corresponding to a shaking manipulation according to an exemplary embodiment.

FIG. 13 is a view illustrating an example of a method for classifying and displaying images according to the shaking manipulation.

As shown in FIG. 13, it is assumed that a plurality of images 211, 212, 213, 214, 215, and 216 stored in the flexible display apparatus 100 are displayed on the display 110 when a photo album application is driven. The displayed images include images 211, 212, and 215 including persons, and images 213, 214, and 215 related to specific places. The flexible display apparatus 100 may display the other images which are not currently displayed on the display 110 but have been pre-stored in the flexible display apparatus 100 in sequence according to a user's touch manipulation (for example, a flick manipulation).

When the user holds one edge of the flexible display apparatus 100 and shakes it, the images 211, 212, 213, 214, 215, and 216 displayed on the display 110 are rearranged and the images 211, 212, 215, 217, 218, and 219 related to persons are displayed on the display 110.

The three images 211, 212, and 215 are images that have been displayed on the display 110 before the shaking manipulation. However, the other images including persons that have not been displayed on the display 110 before the shaking manipulation, but have been pre-stored in the flexible display apparatus 100, such as the images 217, 218, and 219, may be displayed altogether.

After that, when the shaking manipulation is performed again, the images 211, 212, 215, 217, 218, and 219 related to the persons which are displayed on the display 110 are rearranged and images 213, 214, 216, 221, and 222 related to specific places are displayed.

On the other hand, when the number of images of a specific category stored in the flexible display apparatus 100 is less than the number of images that can be displayed on the display 110, an image of a different category is not displayed. However, this is merely an example. That is, when the number of images of a specific category is less than the number of images that can be displayed on the display 110, an image of a different category may be displayed altogether. For example, when the images related to the specific places 213, 214, 216, 221, and 222 are displayed according to the shaking manipulation, an image including a person may be displayed altogether.

As described above, the controller 130 may rearrange the plurality of images displayed on the display 110 according to a category according to the shaking manipulation, and display the images.

Although the images related to the persons and the images related to the places are displayed on the center of the display 110 in sequence according to the shaking manipulation in the above-described exemplary embodiment, this is merely an example. That is, the images satisfying each criterion such as an object or a resolution may be rearranged and displayed on the display 110.

For example, in the case of a resolution, when the shaking manipulation is performed one time, images having a resolution higher than or equal to a predetermined value are displayed, and, when the shaking manipulation is performed two times, images having a resolution lower than the predetermined value may be displayed.

When a plurality of objects are displayed on the display 110 and the shaking manipulation is performed, the controller 130 may move at least one object that is selected from among the plurality of objects according to a user command in a direction opposite to the area where a user grip is sensed, and may display the object. That is, the controller 130 may move the object in the opposite direction to the direction in which the user grips the flexible display apparatus 100, and display the object. In this case, the controller 130 may delete the object that is moved in the direction opposite to the area where the user grip is sensed.

Figure 14:
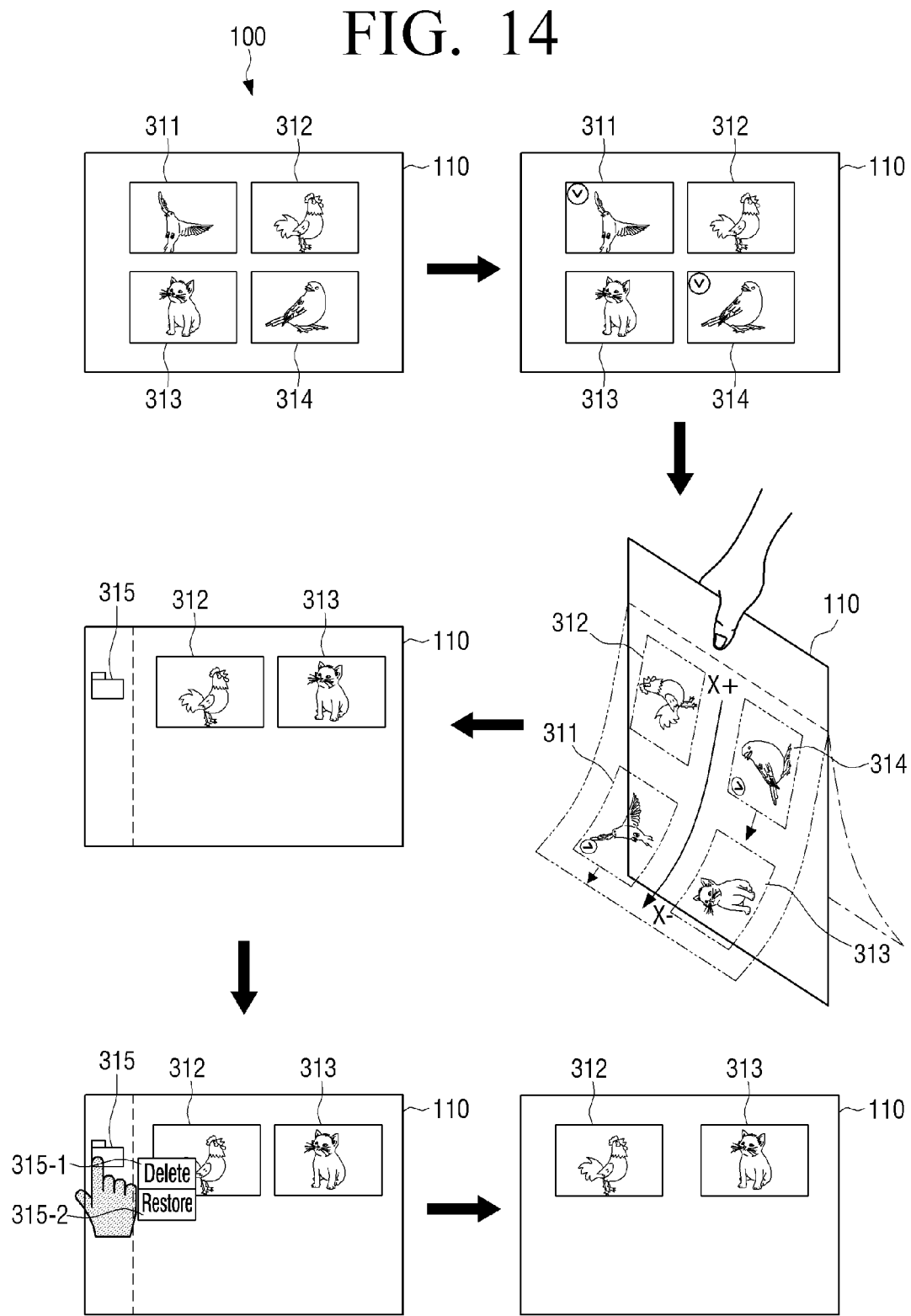

For example, when a plurality of images 311, 312, 313, and 314 are displayed on the display 110, the images 311 and 314 are selected according to a user's touch manipulation as shown in FIG. 14. A check mark (V) may be displayed on the selected images 311 and 314. However, this is merely an example and the selected images 311 and 314 may be distinguished from the other images by being highlighted.

After that, when the shaking manipulation is performed, the selected images 311 and 314 are moved in an X-direction and displayed. Accordingly, when the selected images 311 and 314 are moved to a boundary of the X-direction, they may be grouped and displayed as a GUI 315 in the form of a single folder. However, this is merely an example and they may not be grouped and may be arranged around the boundary.

After that, when the user selects the GUI 315 in the form of the folder, a GUI 315-1 to receive a command to delete the grouped images and a GUI 315-2 to receive a command to restore the grouped images may be displayed.

In this case, when the user selects the GUI 315-2 to receive the restoring command, the grouped images are restored to the original state and the same screen as that before the shaking manipulation is performed may be displayed on the display 110.

However, when the user selects the GUI 315-1 to receive the deleting command, the controller 130 may delete the images 311 and 314 which are stored in the flexible display apparatus 100. However, this is merely an example and the images 311 and 314 may be deleted from the screen only.

In the above-described example, the moved objects are grouped and deleted. However, this is merely an example. That is, when the selected objects are moved to the boundary of the X- direction according to the shaking manipulation, the moved objects may be automatically deleted without a separate command.

On the other hand, when the flexible display apparatus 100 includes a communicator (not shown) to communicate with other devices, the controller 130 may control the communicator (not shown) to transmit the moved at least one object to other devices. The communicator (not shown) may include a short-range wireless communication module of various methods such as Bluetooth and Zigbee.

For example, it is assumed that the flexible display apparatus 100 communicates with other devices in the Bluetooth communication method. When at least one object is moved and displayed according to the shaking manipulation, the controller 130 may control the communicator (not shown) to perform Bluetooth connection with other devices according to the Bluetooth communication method.

Specifically, the controller 130 may check a device that can perform Bluetooth communication and allow communication between the devices by authenticating the checked device, and may control the communicator (not shown) to perform connection with the allowed device. The controller 130 may transmit the at least one object that is moved according to the shaking manipulation to the device that is connected with the flexible display apparatus 100.

Figure 15:
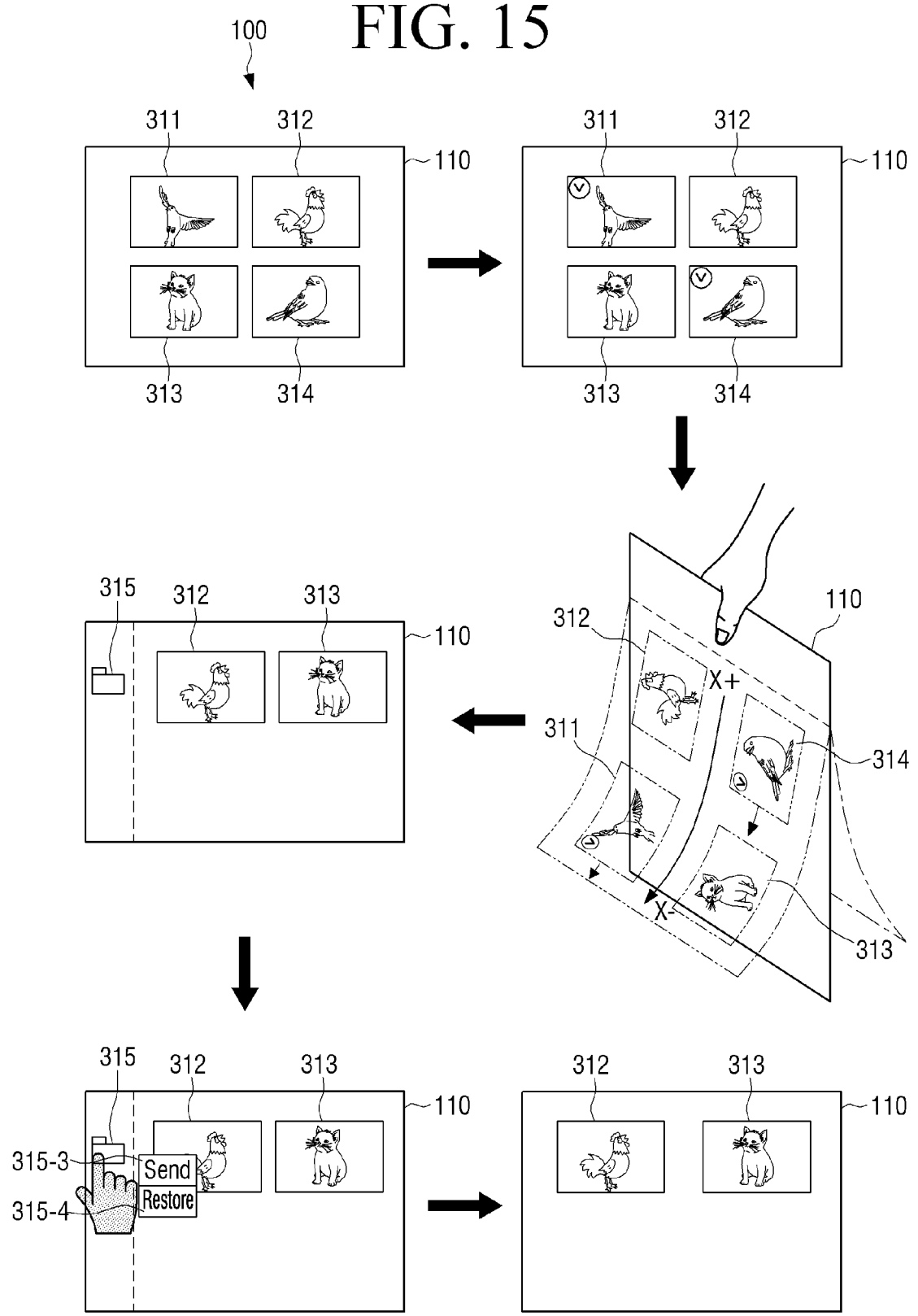

For example, when the shaking manipulation is performed, the selected images 311 and 314 are grouped and displayed as the GUI 315 in the form of a folder as shown in FIG. 15. This has been described in FIG. 14 and thus a redundant explanation is omitted.

On the other hand, when the user selects the GUI 315 in the form of the folder, a GUI 315-3 to receive a command to transmit the grouped images and a GUI 315-4 to receive a command to restore the grouped images may be displayed.

In this case, when the user selects the GUI 315-3 to receive the transmitting command, the controller 130 may control to transmit the grouped images to other devices which are connected to the flexible display apparatus 100.

In the above-described exemplary embodiment, when the shaking manipulation is performed, the communication connection is performed with other devices and the selected object is transmitted. However, the selected object may be transmitted to other devices that are connected with the flexible display apparatus before the shaking manipulation is performed.

Also, in the above-described exemplary embodiment, the images moved according to the shaking manipulation are grouped. However, this is merely an example. That is, when the selected images 311 and 314 are moved to the boundary of the X− direction, they may be automatically transmitted to other devices that are connected with the flexible display apparatus 100 without being grouped. In this case, the selected images 311 and 314 may automatically disappear from the screen on the boundary of the X− direction.

In the above-described exemplary embodiment, the objects are transmitted to other devices which are connected to the flexible display apparatus 100 according to the short-range wireless communication method. However, this is merely an example. That is, when the flexible display apparatus 100 may include a wireless communication module such as $3^{rd}$ generation (3G), $3^{rd}$ generation partnership project (3GPP), and long term evolution (LTE) and access various servers through a mobile communication network, the controller 130 may transmit the selected objects to a cloud server or a social network service (SNS) server when the shaking manipulation is performed. For example, the controller 130 may upload the selected objects into the cloud server or the SNS server using a user account of the flexible display apparatus 100.

On the other hand, when a plurality of objects are displayed on the display 110 and the shaking manipulation is performed, the controller 130 may delete objects other than the object that is displayed on the area where the user grip is sensed.

Specifically, when the area gripped by the user is one area of the display 110, the controller 130 may delete objects other than the object that is displayed at a touch point from the display 110. Also, the controller 130 may delete objects other than the object that is displayed on an area to which pressure is exerted by the user grip from the display 110.

Figure 16:
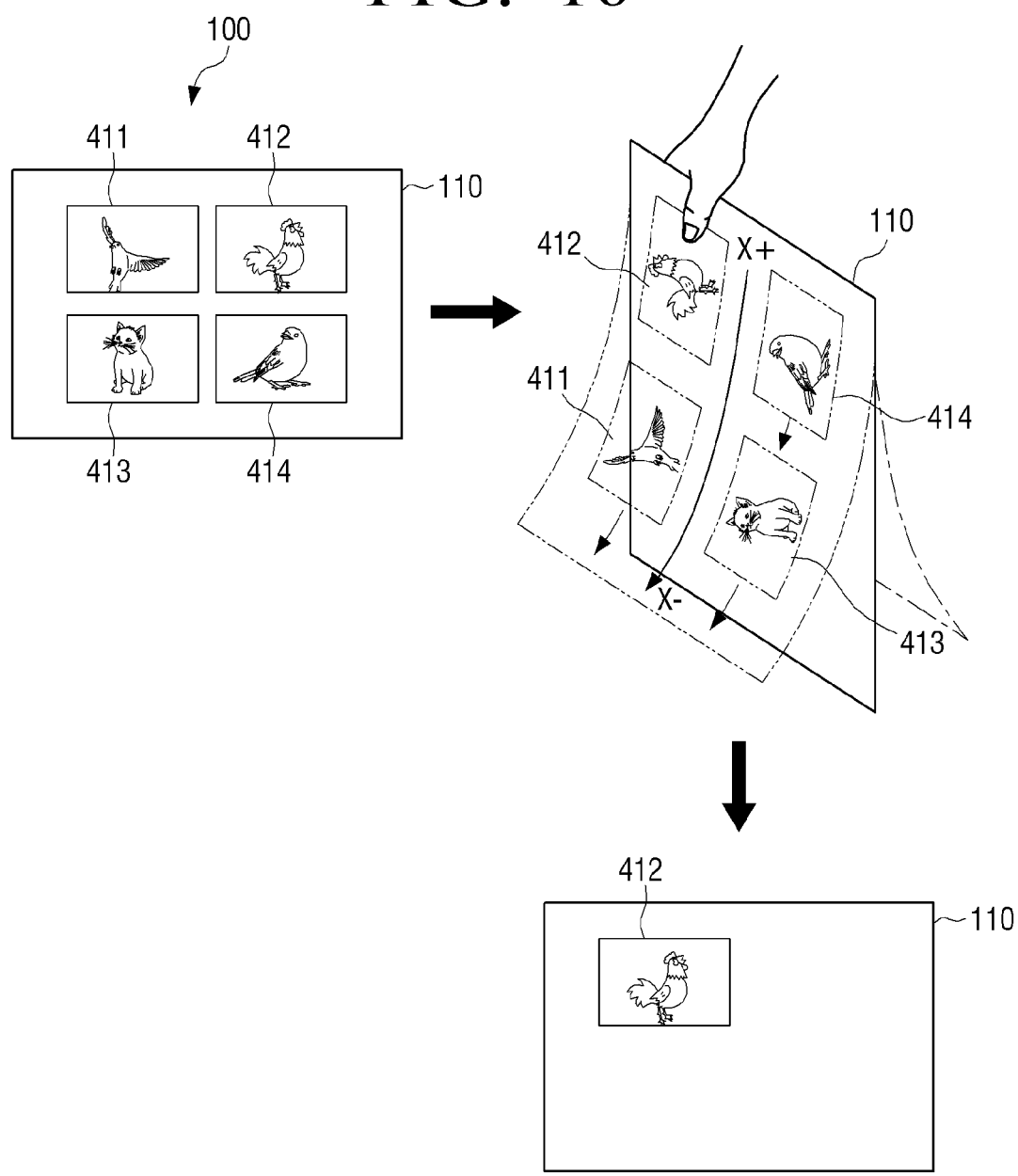

For example, when a plurality of images 411, 412, 413, and 414 are displayed on the display 110 as shown in FIG. 16, and the user touches an area where the image 412 is displayed and shakes the flexible display apparatus 100, the images 411, 413, and 414 other than the image 412 are moved in the X− direction and displayed. When the images 411, 413, and 414 are moved to the boundary of the X− direction, they are deleted and only the image 412 is displayed on the display 110.

In the above-described example, the objects moved in the X− direction are automatically deleted from the display 110. However, this is merely an example. That is, in the case of FIG. 16, the moved objects may be grouped and displayed on the boundary of the display 110, and may be deleted according to a deleting command as in FIG. 14. Also, as in FIG. 15, the moved objects may be grouped and displayed on the boundary of the display 110, and may be transmitted to other devices according to a transmitting command.

On the other hand, the user may move an object that is displayed on the display 110 according to a touch manipulation to grip a desired object and delete it. That is, the controller 130 may move a selected object according to a user's drag and drop manipulation and display it on the display 110, and may delete objects other than the object that is displayed on the area where the user's grip is sensed according to the shaking manipulation.

Figure 17:
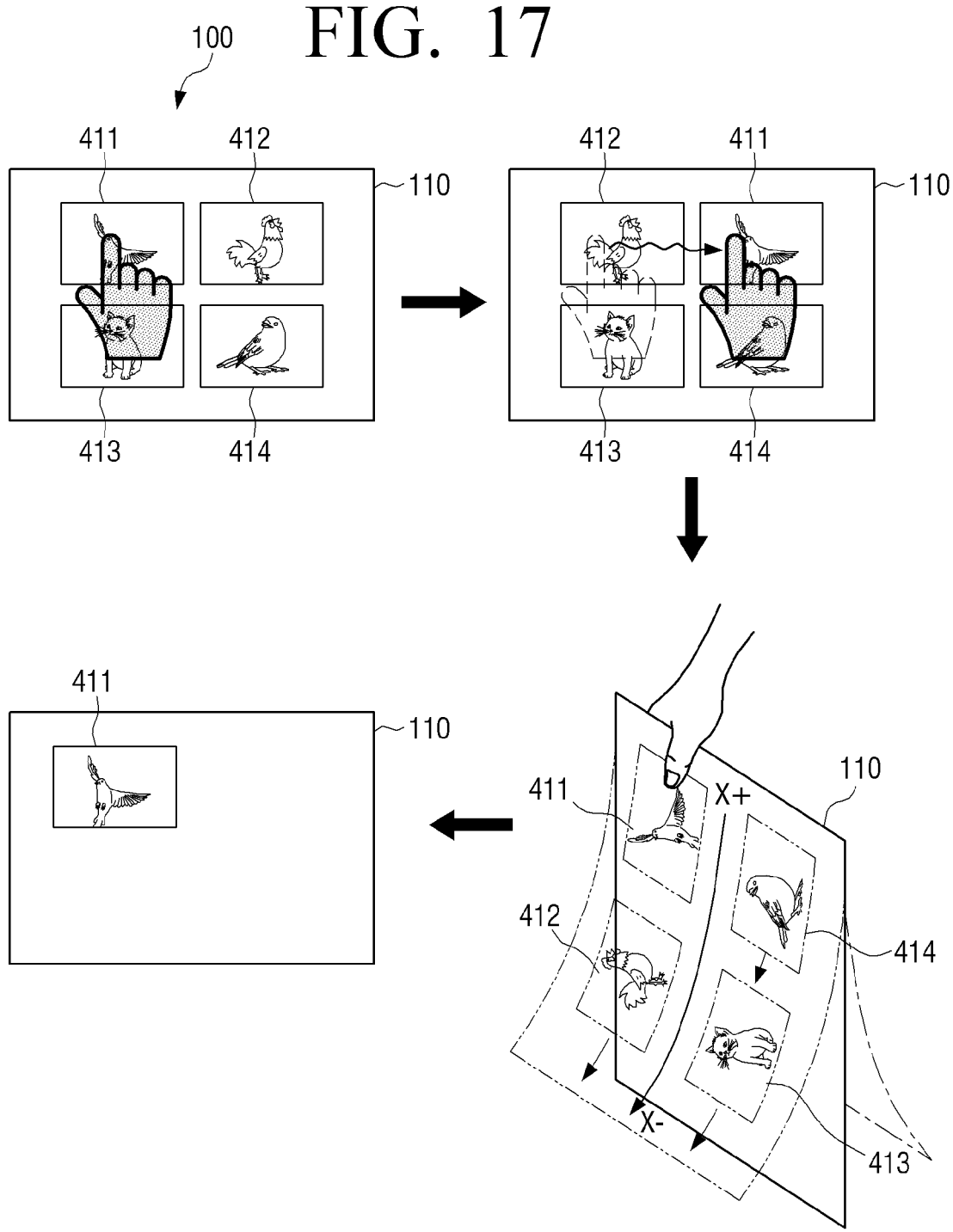

For example, as shown in FIG. 17, when a plurality of images 411, 412, 413, and 414 are displayed on the display 110, and the user touches the image 411 and drags and drops it to the area where the image 412 is displayed, locations of the image 411 and the image 412 are exchanged.

After that, the user shakes the flexible display apparatus 100 while touching the image 411, the other images 412, 413, and 414 are deleted and only the image 411 is displayed on the display 110.

Also, although the user grips and shakes the flexible display apparatus 400 with his/her one hand in the above-described exemplary embodiment, when the user grips one edge of the flexible display apparatus 400 with his/her both hands and shakes it, objects other than the object that is displayed on the user's grip area may be deleted.

Figure 18:
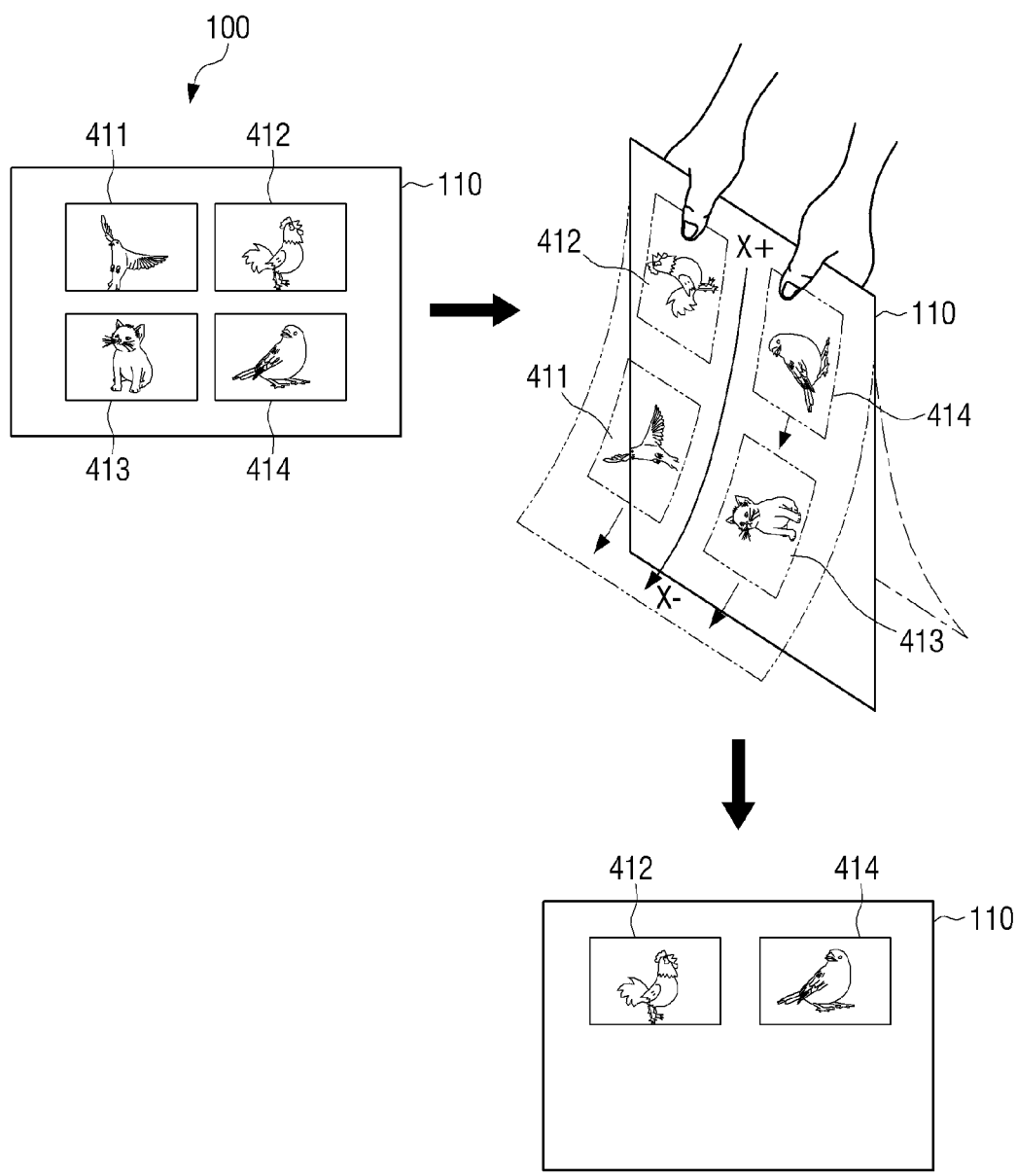

For example, when a plurality of images 411, 412, 413, and 414 are displayed on the display 110, and the user shakes the flexible display apparatus while touching the area of the images 412 and 414 as shown in FIG. 18, the other images 411 and 413 are moved in the X− direction and displayed. In this case, when the images 411 and 413 are moved to the boundary of the X− direction, they are deleted and only the images 412 and 414 are displayed on the display 110.

Also, when a list is displayed on the display 110 as an application is driven and the shaking manipulation is performed, the controller 130 may adjust an amount of information displayed on the list (or depth). The list recited herein may include a list on images, texts, photos, and moving images which are stored in the flexible display apparatus 100.

Specifically, when the shaking manipulation is performed, the controller 130 may increase or reduce an amount of information displayed on the list according to a location of an area where the user grip is performed.

Figure 19:
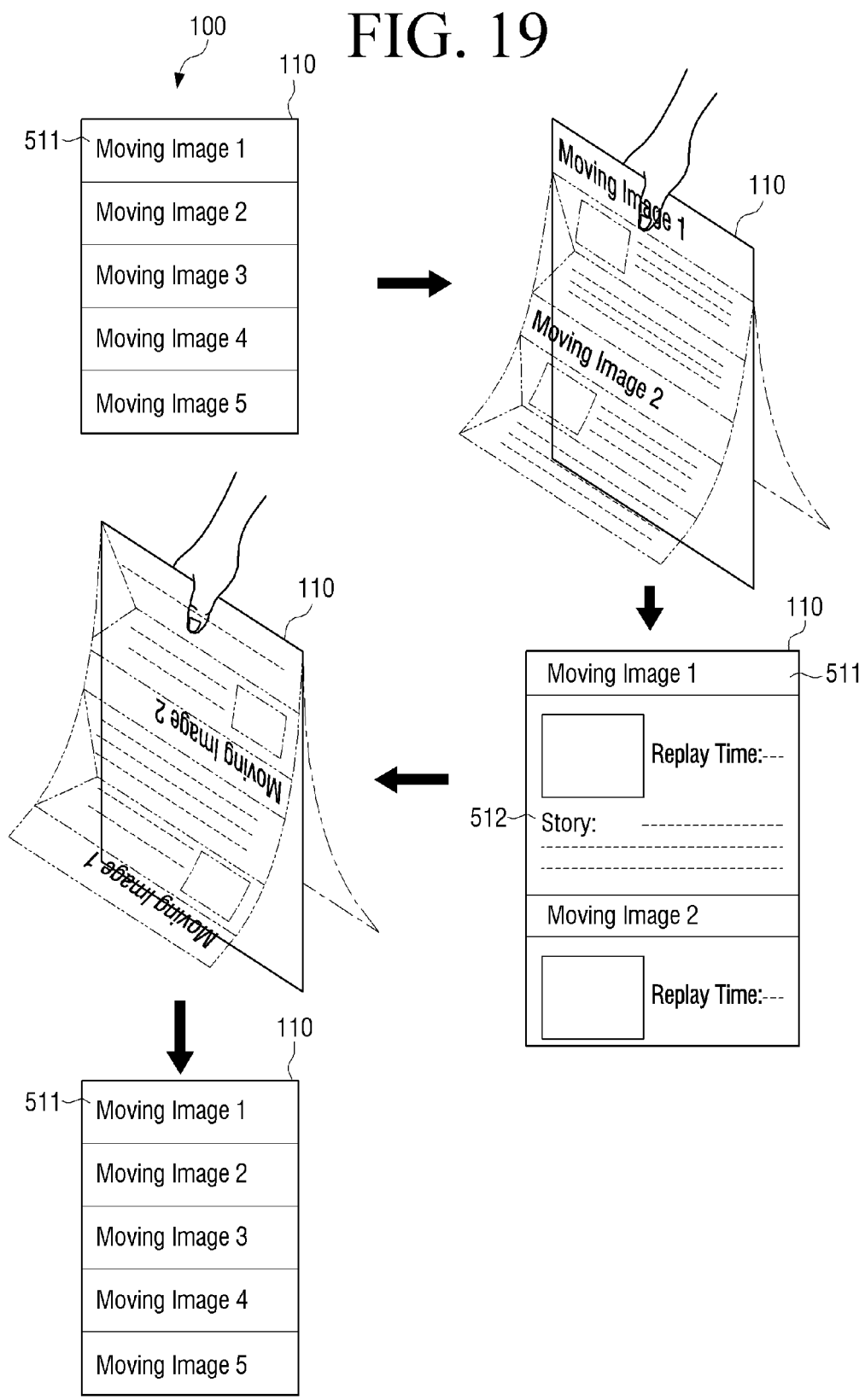

For example, it is assumed that a moving image playback application is driven and a list 511 of various moving image titles is displayed on the display 110 as shown in FIG. 19. In this case, when the user grips an area where the upper part of the list 511 is displayed and shakes the flexible display apparatus, detailed information 512 on each moving image may be further displayed on the list 511 as if a folded part is unfolded. The detailed information 512 may include a title of each moving image, a playback time, a producer, a story, and review.

On the other hand, when the detailed information 512 is displayed, and the user grips an area where the lower part of the list 511 is displayed and shakes the flexible display apparatus, the detailed information 512 disappear as if it is folded and the screen before the initial shaking manipulation is performed may be displayed on the display 110. That is, the list 511 on the moving image titles may be displayed on the display 110.

Also, when a web page is executed as an application is driven and the shaking manipulation is performed, the controller 130 may refresh the web page that is being executed.

Figure 20:
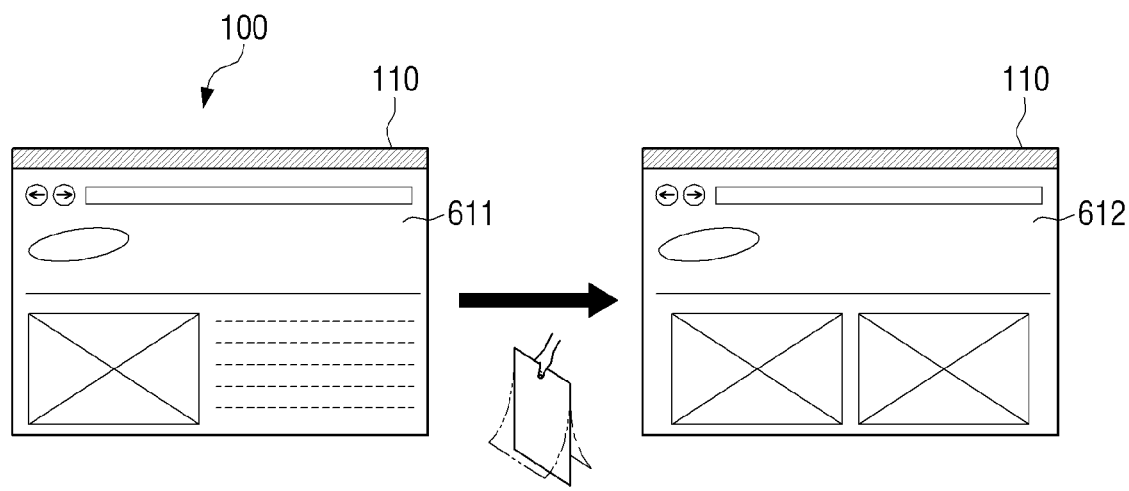

For example, when a specific web page 611 is displayed on the display 110 and the shaking manipulation is performed as shown in FIG. 20, the controller 130 accesses a web server and receives web page data again, and reconfigures a web page screen 612 according to the received web page data and may display the web page screen on the display 110.

To achieve this, the flexible display apparatus 100 may further include a communicator (not shown) to access the web server. That is, the flexible display apparatus 100 may access the web server using a mobile communication network according to various mobile communication standards such as 3G, 3GPP, and LTE, or may access the web server by being connected to an external network according to a wireless communication protocol such as Wi-Fi and IEEE.

On the other hand, although the same web page data is received again and the web page is displayed in the above-described exemplary embodiment, this is merely an example. That is, when the shaking manipulation is performed, the controller 130 may receive web page data which is set by the user as favorites and may display the web page on the display 110.

<Operation Corresponding to Swinging Manipulation>

Figure 21:
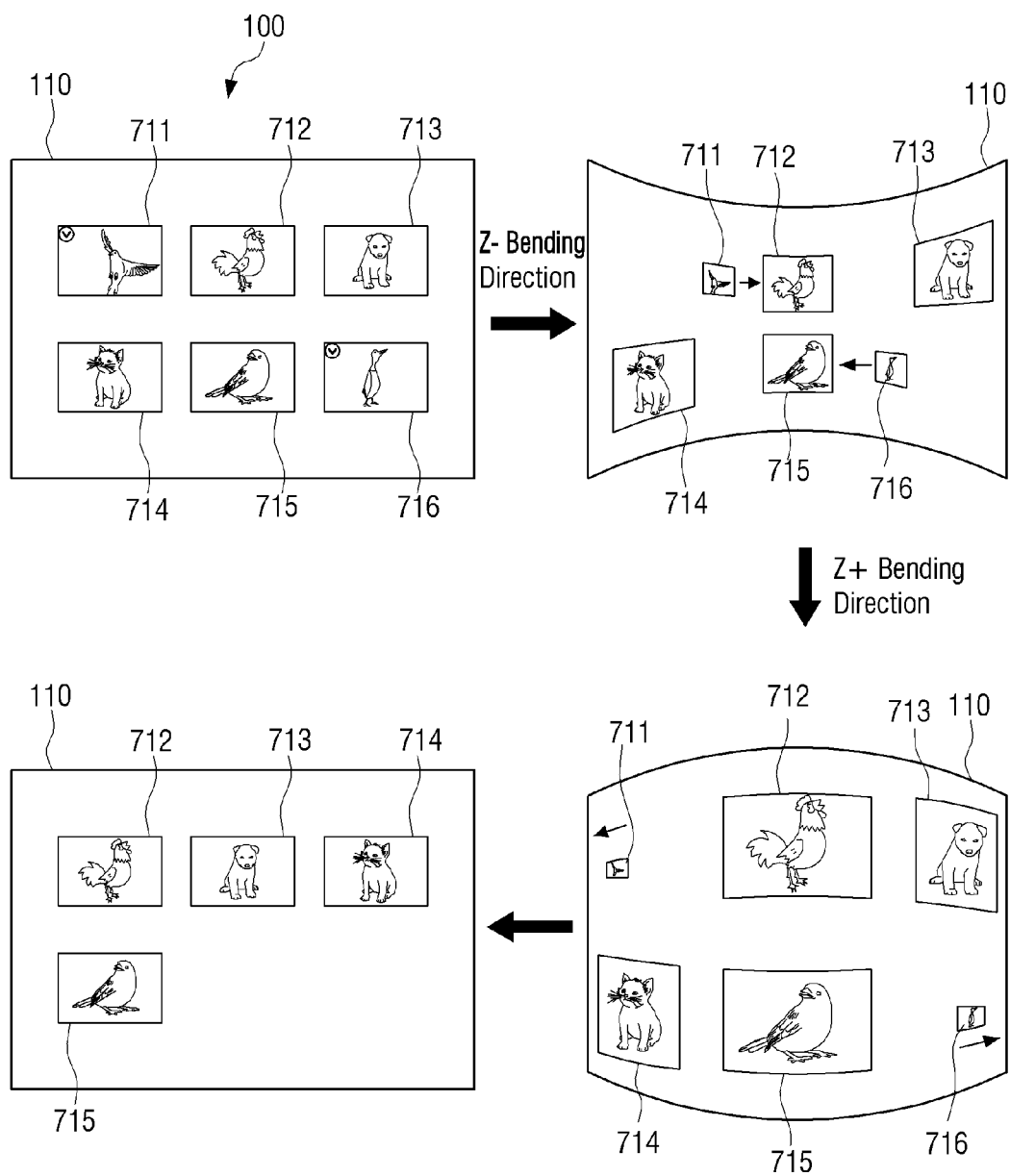
FIGS. 21 through 22 are views illustrating an operation corresponding to a swinging manipulation according to an exemplary embodiment.
Figure 22:
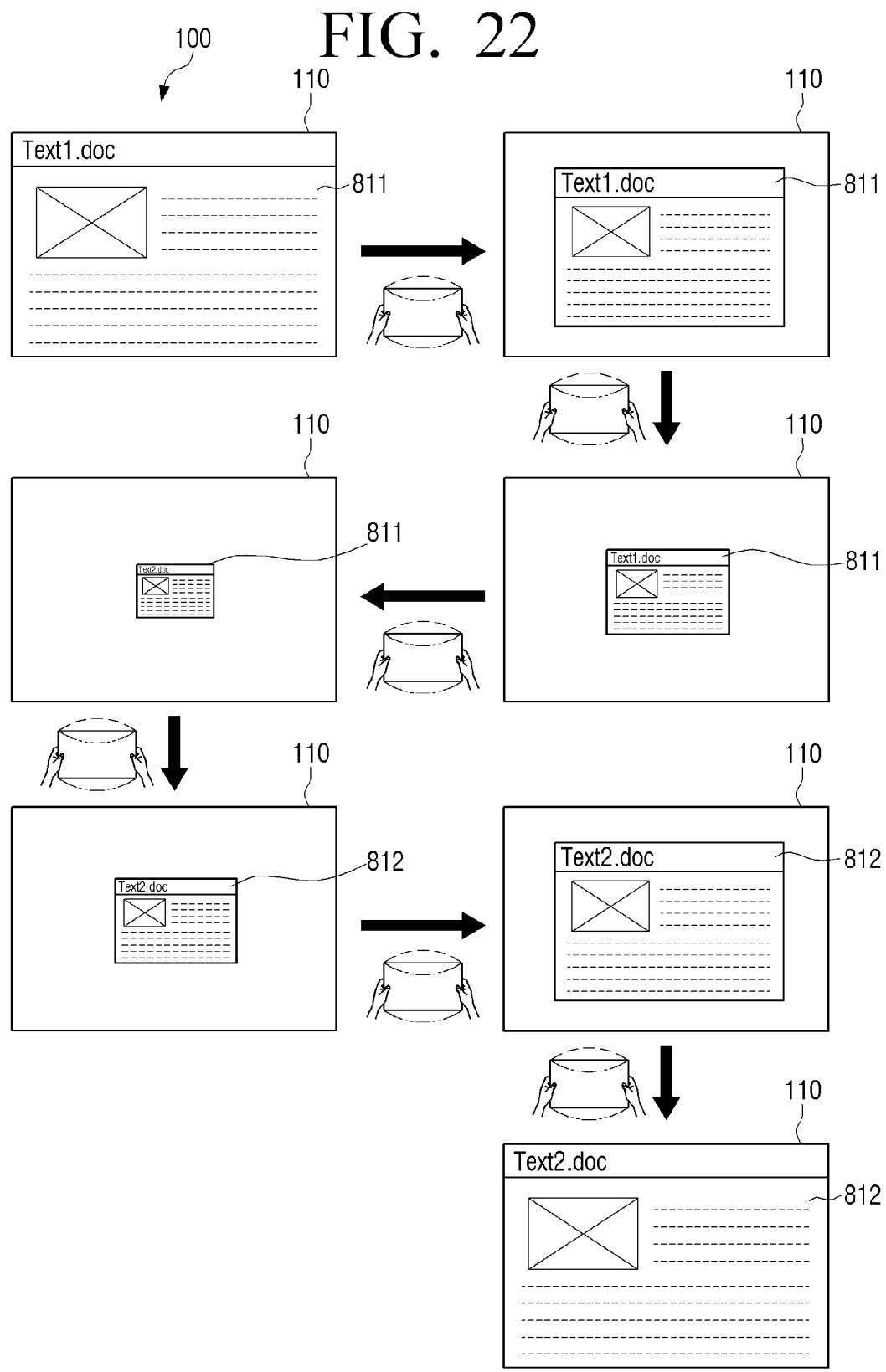

FIGS. 21 and 22 are views to illustrate an operation corresponding to a swinging manipulation according to an exemplary embodiment.

When a swinging manipulation is performed, the controller 130 may perform various operations corresponding to the swinging manipulation according to an application which is executed in the flexible display apparatus 100.

First, a case in which a plurality of objects are displayed on the display 110 when an application is driven will be explained. The object recited herein may include all items that can be displayed on the display 110 such as icons, images, texts, and photos.

When a plurality of objects are displayed on the display 110 and the swinging manipulation is performed, the controller 130 may delete at least one object which is selected from among the plurality of objects according to a user command, and may rearrange and display the other objects.

For example, it is assumed that a plurality of images 711, 712, 713, 714, 715, and 716 are displayed on the display 110, and the images 711 and 716 are selected according to a user touch manipulation as shown in FIG. 21.

In this case, when bending in the Z− direction is performed, the selected images 711 and 716 are gradually reduced, moved to a bending line, and displayed. On the other hand, when bending in the Z+ direction is performed, the selected images 711 and 718 are gradually reduced, moved to opposite edges from the bending line, and displayed.

When bending in the Z− direction and bending in the Z+ direction are alternately repeated swiftly, the selected images 711 and 716 disappear as if they are sucked into the display 110. When the selected images 711 and 716 disappear, the images 712, 713, 714, and 715 that are not selected are rearranged and displayed on the display 110 in sequence.

On the other hand, the controller 130 may control to remove an object which is displayed on the display 110 and display a new object on the display 110. At this time, the controller 130 may gradually reduce a size of the object displayed on the display 110 when removing it from the screen, and may gradually increase a size of the new object when displaying it on the screen.

For example, as shown in FIG. 22, when a text document 811 is displayed on the display 110 as an application is driven and the swinging manipulation is performed, the text document 811 displayed on the display 110 is gradually reduced and disappears, and a new text document 812 is gradually magnified and displayed. In this case, the controller 130 may store the removed text document 811 in the flexible display apparatus 100.

Although the text document is illustrated in the above-described exemplary embodiment, this is merely an example. That is, the above-described exemplary embodiment may be applied to an image and a moving image besides the text document.

When the shaking manipulation or the swinging manipulation is performed, the controller 130 may control to perform a different operation according to a number of times that the display 110 is bent alternately. That is, when the shaking manipulation or the swinging manipulation is performed, the controller 130 may count the number of times that the display 110 is bent alternately, and may control an executed application to perform a different operation according to the number of times.

For example, it is assumed that a moving image is played back on the display 110. When the shaking manipulation is performed as the display 110 is bent alternately one time, the controller 130 may pause playback of the moving image, and when the shaking manipulation is performed as the display 110 is bent alternately two times, the controller 130 may play back a previous moving image of the moving image which is currently played back on the list of moving images. Also, when the shaking manipulation is performed as the display 110 is bent alternately three times, the controller 130 may play back a next moving image of the moving image which is currently played back on the list of moving images.

Also, it is assumed that a plurality of applications are driven according to a multi-tasking function and the display 110 displays an execution screen on one of the driven applications.

It is assumed that an application is driven and an application execution screen is displayed on the display 110. At this time, when the shaking manipulation is performed as the display 110 is bent alternately one time, the controller 130 may execute a specific function that can be performed by the executed application, and, when the shaking manipulation is performed as the display 110 is bent alternately two times, the controller 130 may display an execution screen of another application which is being driven according to the multi-tasking function on the display 110. Also, when the shaking manipulation is performed as the display 110 is bent alternately three times, the controller 130 may display a home screen on the display 110. The home screen recited herein refers to a screen that includes icons corresponding to the plurality of applications installed in the flexible display apparatus 100.

In the above-described exemplary embodiment, the shaking manipulation is illustrated. However, the same is applied to the swinging manipulation.

Also, the controller 130 may control to perform a different operation according to a location of an area of the display 110 gripped by the user when the shaking manipulation or the swinging manipulation is performed. That is, the controller 130 may determine which area of the display 110 is pressed by the user grip or touched from among an edge, a center and a corner, and may perform an operation corresponding to the determined area.

For example, it is assumed that objects displayed on the display 110 are rearranged according to the shaking manipulation as shown in FIG. 13. In this case, when the user grips an edge and shakes the display 110, the controller 130 may display only the images related to specific places on the display 110. When the user grips the center and shakes the display 110, the controller 130 may display only the images including persons on the display 110, and, when the user grips a corner and shakes the display 110, the controller 130 may display only the images having a resolution higher than a predetermined value on the display 110.

Also, the controller 130 may control a moving speed of the object displayed on the display 110 according to a speed at which the display 110 is bent alternately when the shaking manipulation or the swinging manipulation is performed. Specifically, as the resistance value output from the bend sensor for a predetermined time is changed swiftly, the controller 130 determines that the speed at which the display 110 is bent alternately is high and thus may move the object displayed on the display 110 swiftly as the bending speed increases.

For example, in the exemplary embodiments of FIGS. 14 to 18, as the bending speed increases, the controller 130 may move the image displayed on the display 110 swiftly. Also, in the exemplary embodiment of FIG. 19, the controller 130 may display the list as if it is spread and disappears swiftly as the bending speed increases.

Also, in the exemplary embodiment of FIG. 21, the controller 130 may move the image displayed on the display 110 swiftly and remove it swiftly as the bending speed increases. Also, in the exemplary embodiment of FIG. 22, the controller 130 may remove the text document displayed on the display 110 swiftly and display the new text document swiftly as the bending speed increases.

Figure 23:
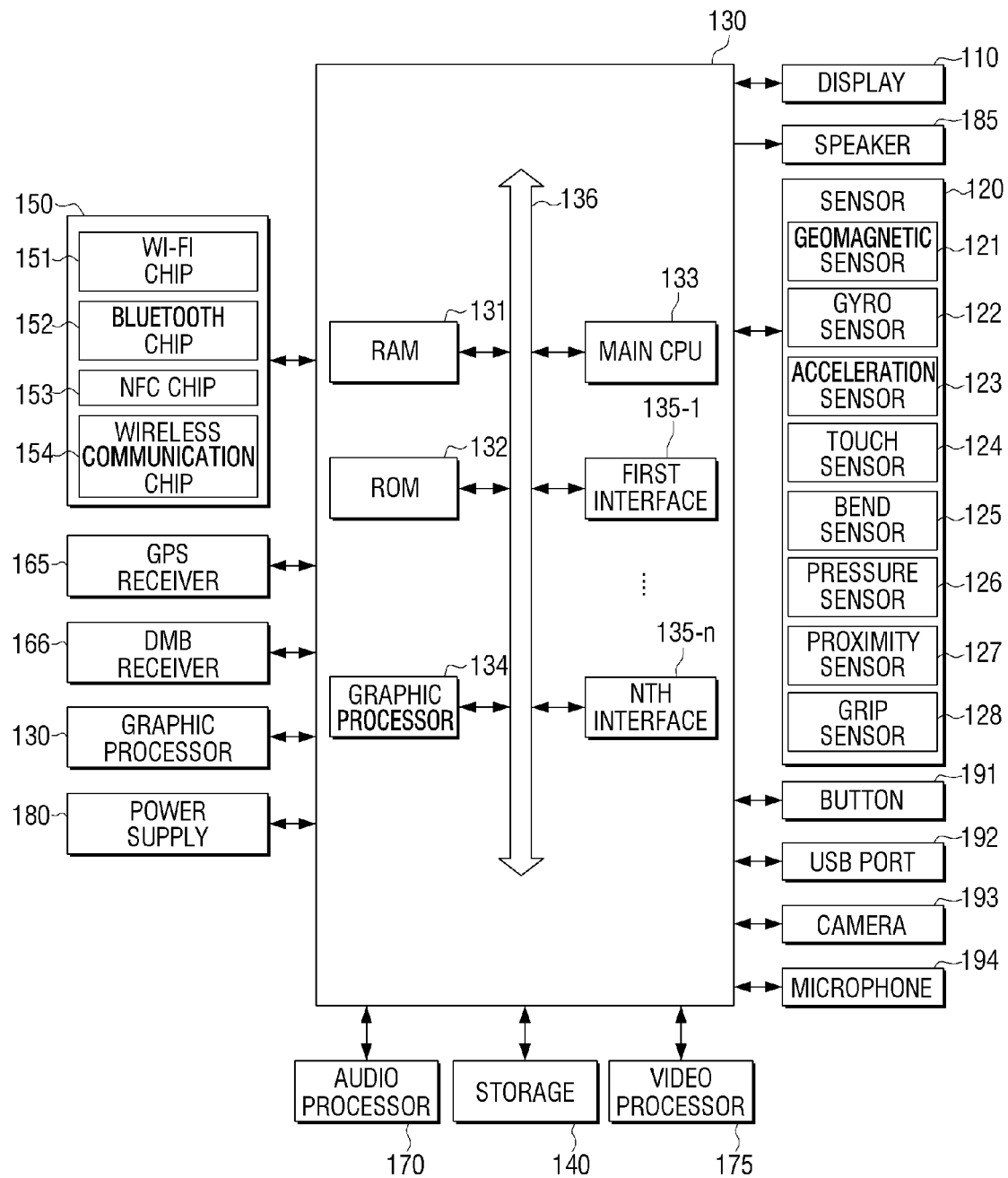
FIG. 23 is a diagram illustrating an example of a detailed configuration of a flexible display apparatus according to an exemplary embodiment.

FIG. 23 is a block diagram illustrating an example of a detailed configuration of a flexible display apparatus according to an exemplary embodiment. Referring to FIG. 23, the flexible display apparatus 100 includes a storage 140, a communicator 150, a GP receiver 165, a DMB receiver 166, an audio processor 170, a video processor 175, a power supply 180, a speaker 185, a button 191, a USB port 192, a camera 193, and a microphone 194 besides the elements shown in FIG. 1.

The sensor 120 includes a geomagnetic sensor 121, a gyro sensor 122, an acceleration sensor 123, a touch sensor 124, a bend sensor 125, a pressure sensor 126, and a proximity sensor 127. The sensor 120 may sense various manipulations such as touch, rotation, tilt, pressure, and approach on the flexible display apparatus, in addition to the above-described bending manipulation.

The geomagnetic sensor 121 is a sensor that senses a rotation state and a moving direction of the flexible display apparatus 100. The gyro sensor 122 is a sensor that senses a rotation angle of the flexible display apparatus 100. Although both the geomagnetic sensor 121 and the gyro sensor 122 may be provided, the flexible display apparatus 100 may sense the rotation state even when only one of them is provided.

The acceleration sensor 123 is a sensor that senses a degree of tilt of the flexible display apparatus 100. Besides this, the acceleration sensor 123 may sense bending characteristics such as a bending direction or a bending area of the flexible display apparatus 100, or may sense a swinging or shaking manipulation.

The touch sensor 124 may be implemented in the form of a capacitive type or a resistive type of sensor. The capacitive type calculates touch coordinates by sensing minute electricity excited in a user's body when a part of the user's body touches the surface of the display 110, using a dielectric substance coated on the surface of the display 110. The resistive type includes two electrode plates, and, when a user touches a screen, calculates touch coordinates by sensing an electric current flowing due to contact between upper and lower plates at the touched point. As described above, the touch sensor 124 may be embodied in various forms.

The bend sensor 125 may be implemented in various shapes and numbers as described above, and may sense a bending state of the flexible display apparatus 100. The configuration and operation of the bend sensor 125 has been described above and thus a redundant explanation is omitted.

The pressure sensor 126 senses a magnitude of pressure exerted to the flexible display apparatus 100 when the user performs a touch or bending manipulation, and provides the magnitude of pressure to the controller 130. The pressure sensor 126 may include a piezo film which is embedded in the display 110 and outputs an electric signal corresponding to the magnitude of pressure. Although the pressure sensor 126 is a separate element from the touch sensor 124 in FIG. 23, when the touch sensor 124 is implemented in the form of a resistive touch sensor, the resistive touch sensor may also perform the function of the pressure sensor 126.

The proximity sensor 127 senses a motion which approaches without directly contacting the display surface. The proximity sensor 127 may be implemented in the form of various types of sensors such as a high-frequency oscillation type proximity sensor which forms a high frequency magnetic field and detects an electric current induced by a magnetic characteristic which is changed when an object approaches, a magnetic type proximity sensor which uses a magnet, and a capacitive type proximity sensor which detects capacitance that changes when an object approaches, etc.

The grip sensor 128 is disposed on a border or a handle of the flexible display apparatus 100 separately from the pressure sensor 126, and senses a user's grip. The grip sensor 128 may be implemented in the form of a pressure sensor or a touch sensor.

The controller 130 analyzes various sensing signals sensed by the sensor 120, determines a user's intention, and performs an operation corresponding to the intention. That is, as described above, the controller 130 determines whether a swinging or shaking manipulation is performed or not based on a result of sensing by the sensor 120, and performs a corresponding operation.

Also, the controller 130 may perform a control operation according to various input methods such as touch manipulation, motion input, voice input, and button input. The touch manipulation may include various manipulations such as simple touch, tap, touch and hold, move, flick, drag and drop, pinch-in and pinch-out.

For example, the controller 130 may execute an application stored in the storage, configure its execution screen, and display it, and may play back various contents stored in the storage 140. The content recited herein may refer to various multimedia contents such as images, texts, photos, and moving images. Also, the controller 130 may communicate with external apparatuses through the communicator 150.

The communicator 150 is configured to communicate with various types of external apparatuses according to various communication methods. The communicator 150 may include a Wi-Fi chip 151, a Bluetooth chip 152, a near field communication (NFC) chip 153, and a wireless communication chip 154. Using these configurations, the communicator 150 may receive contents from various types of external apparatuses and may transmit contents to various types of external apparatuses.

The Wi-Fi chip 151, the Bluetooth chip 152, and the NFC chip 153 communicate with external apparatuses in a Wi-Fi method, a Bluetooth method, and an NFC method, respectively. Among these, the NFC chip 153 is operated in the NFC method, which uses 13.56 MHz from among various RF-ID frequency bands such as 135 kHz, 13.56 MHz, 433 MHz, 860~960 MHz, and 2.45 GHz. When the Wi-Fi chip 151 or the Bluetooth chip 152 is used, a variety of connection information such as an SSID and a session key is exchanged first and connection is established using the connection information, and then, a variety of information is exchanged. The wireless communication chip 154 communicates with external apparatuses according various communication standards such as IEEE, Zigbee, $3^{rd}$ generation (3G), $3^{rd}$ generation partnership project (3GPP), and long term evolution (LTE).

The GPS receiver 165 receives a GPS signal from a GPS satellite and calculates a current position of the flexible display apparatus 100.

The DMB receiver 166 receives a digital multimedia broadcasting (DMB) signal and processes the same.

The power supply 180 supplies power to the elements of the flexible display apparatus 100. The power supply 180 may be implemented by including an anode collector, an anode electrode, an electrolyte, a cathode electrode, a cathode collector, and a sheath enclosing the aforementioned members. The power supply 180 may be implemented in the form of a secondary cell which is chargeable and dischargeable. The power supply 180 may be implemented in a flexible form so that it can be bent along with the flexible display apparatus 100. In this case, the collector, the electrode, the electrolyte, and the sheath may be made of a flexible material. A detailed shape and a material of the power supply 180 will be explained below.

The audio processor 170 refers to an element that processes audio data. The audio processor 170 performs various processing operations such as decoding, amplifying, and noise filtering with respect to audio data.

The video processor 175 processes video data. The video processor 175 may perform various image processing operations such as decoding, scaling, noise filtering, frame rate conversion, and resolution conversion with respect to video data.

The display 110 may display various screens or objects under the control of the controller 130. For example, the controller 130 signal-processes various images, texts, photos, and moving images stored in the storage 140 into a form processible by the display 110 through the audio processor 170 and the video processor 175, and displays the same on the display 110. Also, the controller 130 may display a screen for receiving various user commands on the display 110.

The speaker 185 is an element that outputs various notice sounds and voice messages as well as various audio data processed by the audio processor 170.

The button 191 may be implemented in the form of various kinds of buttons such as a mechanical button, a touch button, and a wheel, which are formed on a certain area of the flexible display apparatus 100, such as a front surface, a side surface, or a rear surface of a body exterior of the flexible display apparatus 100. Through the button 191, various user manipulations to control the operation of the flexible display apparatus 100 such as a power on/off command may be received.

The USB port 192 refers to a port through which a USB memory or a USB connector is connected to the flexible display apparatus 100, and the flexible display apparatus 100 receives various contents from an external apparatus or transmits them to an external apparatus through the USB port 192.

The camera 193 is configured to capture a still image or a moving image under the control of the user. The camera 193 may be a plurality of cameras including a front camera and a rear camera.

The microphone 194 receives a user's voice or other sounds and converts them into audio data. The controller 130 may use a user's voice input through the microphone 194 for a call process or may convert it into audio data and store the audio data in the storage 140.

When the camera 193 and the microphone 194 are provided, the controller 130 may perform a control operation according to a user voice input through the microphone 194 or a user motion recognized by the camera 193. That is, the flexible display apparatus 100 may be operated in a motion control mode or a voice control mode.

For example, in the motion control mode, the controller 130 activates the camera 193 and captures a user, traces a change in the user motion, and performs a control operation such as power on/off. In the voice control mode, the controller 130 may perform voice recognition by analyzing a user voice input through the microphone and performing a control operation according to the analyzed user voice.

The flexible display apparatus 100 may further include various external input ports to connect the flexible display apparatus 100 to various external terminals such as a headset, a mouse, and a local area network (LAN).

The above-described operation of the controller 130 may be performed by a program which is stored in the storage 140. The storage 140 may store various data such as operating system (OS) software for driving the flexible display apparatus 100, various applications, and various data and contents which are input or set while the application is executed.

The controller 130 controls the overall operation of the flexible display apparatus 100 using various programs stored in the storage 140.

The controller 130 includes a random access memory (RAM) 131, a read only memory (ROM) 132, a main CPU 133, a graphic processor 134, first to nth interfaces 135-1~135-n, and a bus 136.

The RAM 131, the ROM 132, the main CPU 133, and the first to the nth interfaces 135-1~135-n may be connected to one another through the bus 136.

The first to the nth interfaces 135-1~135-n are connected to the above-described various elements. One of these interfaces may be a network interface which is connected to an external apparatus through a network.

The main CPU 133 accesses the storage 140 and performs booting using the O/S stored in the storage 140. The main CPU 133 performs various operations using the various programs, content, and data stored in the storage 140.

The ROM 132 stores a set of commands to boot the system. When a turn on command is input and power is supplied, the main CPU 133 copies the O/S stored in the storage 140 to the RAM 131 according to a command stored in the ROM 132, executes the O/S and boots the system. When the booting is completed, the main CPU 133 copies the various application programs stored in the storage 140 into the RAM 131, executes the programs copied into the RAM 131, and performs various operations.

The graphic processor 134 may configure various screens under the control of the main CPU 133. Specifically, the graphic processor 134 may display screens shown in FIGS. 26 to 35. The graphic processor 134 calculates a display state value of the screen. The display state value may be an attribute value indicating coordinate values of a location where an object is to be displayed on the screen, and a shape, a size, and color of an object. When the display state value is calculated, the graphic processor 134 performs rendering and generates a screen based on the display state value.

The configuration of the flexible display apparatus shown in FIG. 23 is merely an example and some of the elements shown in FIG. 23 may be omitted or changed and another element may be added according to an exemplary embodiment.

As described above, the controller 130 may perform various operations by executing a program stored in the storage 140.

Figure 24:
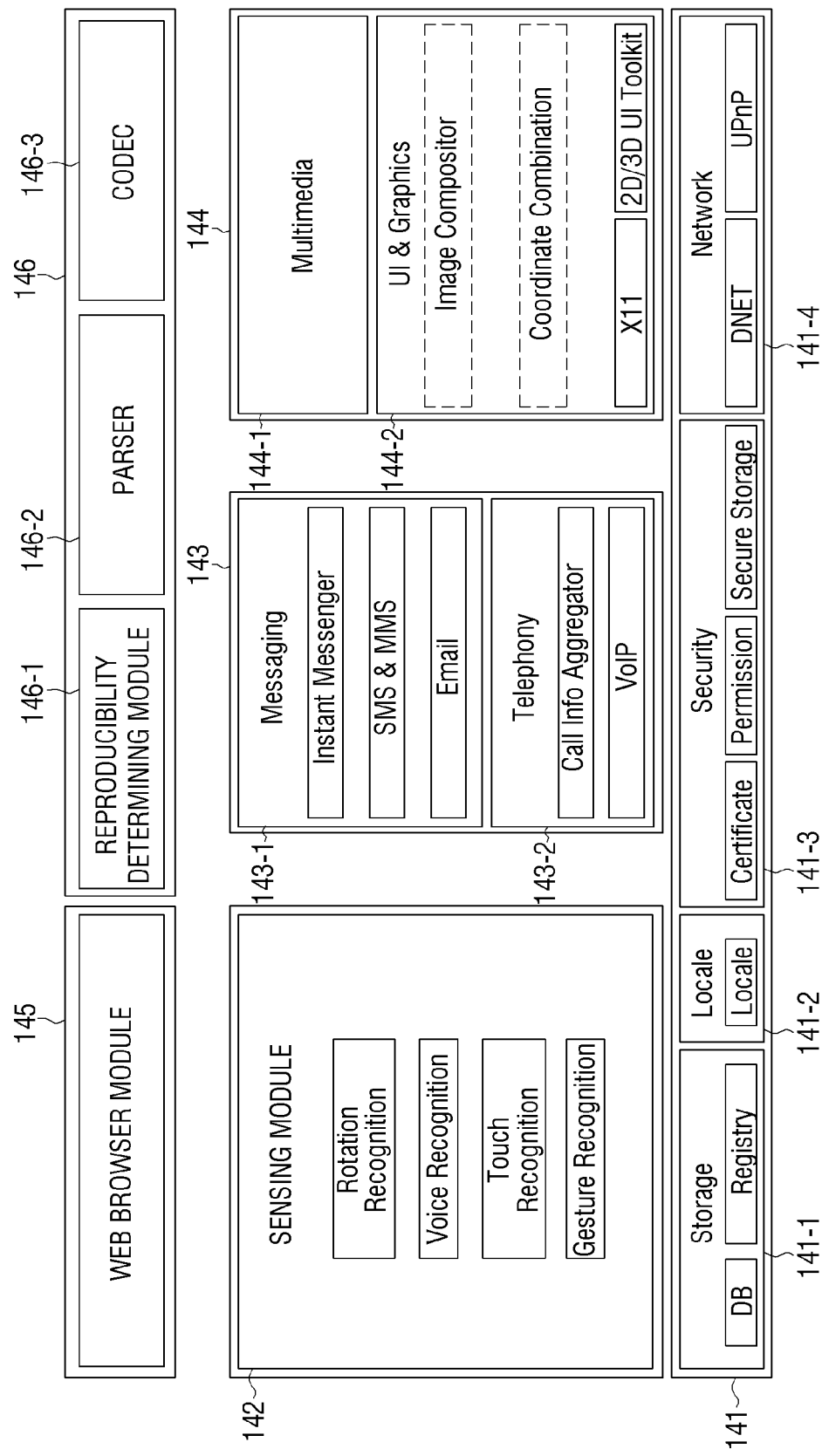
FIG. 24 is a view illustrating a hierarchy of software stored in a storage.

FIG. 24 is a view to illustrate a hierarchy of software stored in the storage. Referring to FIG. 24, the storage 140 includes a base module 141, a sensing module 142, a communication module 143, a presentation module 144, a web browser module 145, and a content processing module 146.

The base module 141 refers to a module which processes signals transmitted from each hardware included in the flexible display apparatus 100 and transmits the signals to an upper layer module.

The base module 141 includes a storage module 141-1, a location-based module 141-2, a security module 141-3, and a network module 141-4.

The storage module 141-1 is a program module which manages a database (DB) or a registry. The CPU 133 may access the database in the storage 140 using the storage module 141-1, and may read out various data. The location-based module 141-2 is a program module which is interlocked and/or interacts with various hardware such as a GPS chip and supports a location-based service. The security module 141-3 is a program module which supports certification for hardware, permission of a request, and a secure storage. The network module 141-4 is a module to support network connection, and includes a Distributed.net (DNET) module and a Universal Plug and Play (UPnP) module.

The sensing module 142 is a module which manages external input and information on external devices, and uses the same. The sensing module 142 may include a rotation recognition module, a voice recognition module, a touch recognition module, and a gesture recognition module. The rotation recognition module is a program that calculates a rotation angle and a rotation direction using a sensing value sensed by a sensor such as the geomagnetic sensor 121 and the gyro sensor 122. The voice recognition module is a program that analyzes a voice signal collected by the microphone 194 and extracts a user voice, and the touch recognition module is a program that detects touch coordinates using a sensing value sensed by the touch sensor 124. The gesture recognition module is a program that recognizes a user's gesture by analyzing an image photographed by the camera 194.

The communication module 143 is a module to communicate with an external apparatus. The communication module 143 includes a messaging module 143-1 such as a messenger program (e.g., an instant messenger program, etc.), a short message service (SMS) and multimedia message service (MMS) program, and an email program, and a telephony module 143-2 which includes a call information aggregator program module and a voice over internet protocol (VoIP) module.

The presentation module 144 is a module which generates a display screen. The presentation module 144 includes a multimedia module 144-1 to reproduce multimedia content and output the multimedia content, and a user interface (UI) and graphic module 144-2 to process a UI and graphics. The multimedia module 144-1 may include a player module, a camcorder module, and a sound processing module. Accordingly, the multimedia module 144-1 generates a screen and a sound by reproducing various multimedia content, and reproduces the same. The UI and graphic module 144-2 may include an image compositor module to combine images, a coordinate combination module to combine coordinates on a screen to display an image and generate coordinates, an X11 module to receive various events from hardware, and a 2D/3D UI toolkit to provide a tool for configuring a UI of a 2D or 3D format.

The web browser module 145 is a module which performs web-browsing and accesses a web server. The web browser module 145 may include a web view module to render and view a web page, a download agent module to download, a bookmark module, and a web-kit module.

The content processing module 146 refers to software that processes content stored in the storage 140. A reproducibility determining module 146-1 is a program that operates as an algorithm for comparing reproducibility information and content attributes. A parser 146-2 and a codec 146-3 are software that is provided to the video processor 175 to process content. The parser 146-2 may be generally implemented in the form of only software and the codec 146-3 may be implemented in the form of software or hardware.

Besides these, the storage 140 may further include various application modules such as a navigation service module and a game module.

Some of the program modules shown in FIG. 24 may be omitted, changed or added according to a kind and a characteristic of the flexible display apparatus 100. For example, when the flexible display apparatus 100 is a smartphone, an e-book application, a game application, and other utility programs may be further included. Also, some of the program modules of FIG. 24 may be omitted.

According to an exemplary embodiment, when the shaking manipulation or swinging manipulation is performed, the flexible display apparatus 100 may control objects displayed on the screen as described above. Also, the flexible display apparatus 100 may be interlocked with a display apparatus 100 and may control the objects displayed on the screen of the display apparatus 100.

Figure 25A:
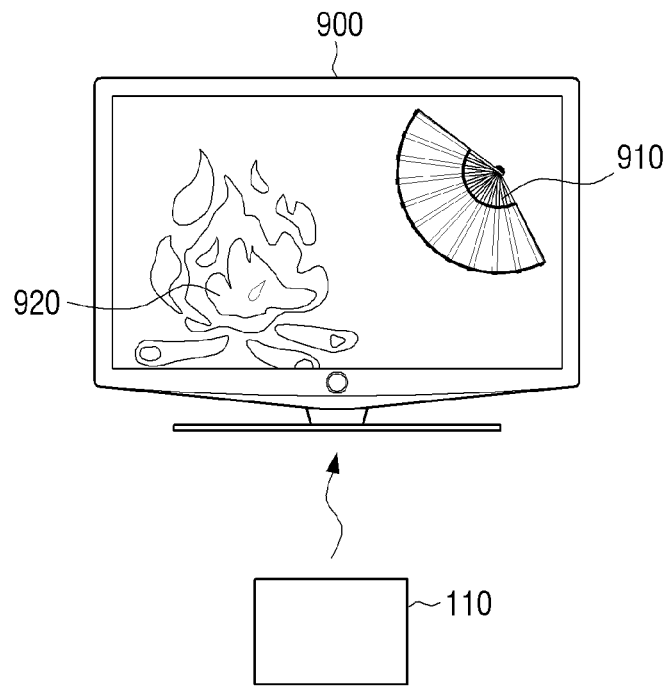
FIGS. 25A through 26B are views illustrating a configuration of a flexible display apparatus which is interlocked with an external display apparatus according to an exemplary embodiment.
Figure 26A:
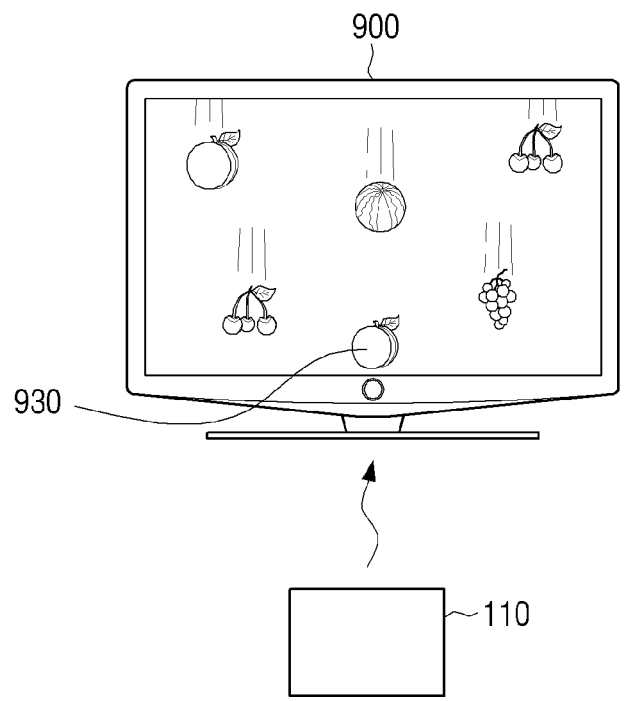
Figure 26B:
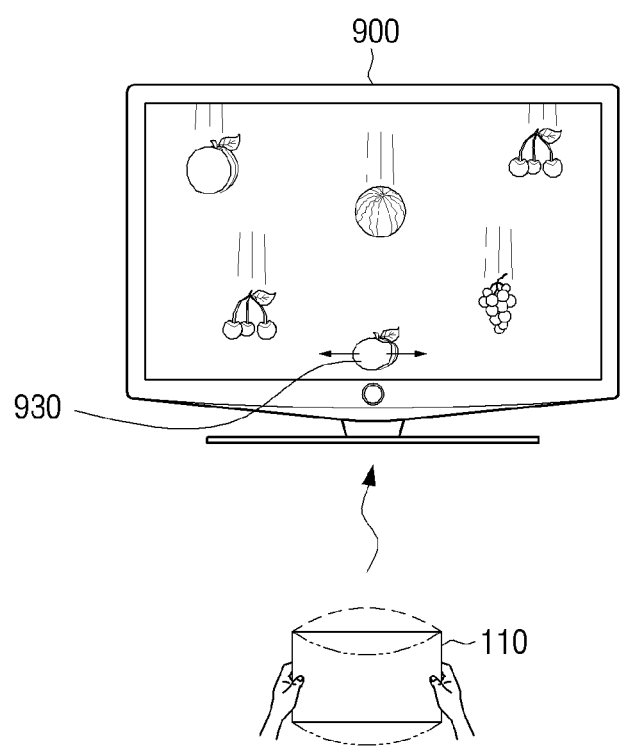

FIGS. 25A and 26B are views to illustrate a configuration of a flexible display apparatus which is interlocked with an external display apparatus according to an exemplary embodiment.

Referring to FIGS. 25A and 26B, the flexible display apparatus 100 may be connected with a display apparatus 900 in a wired or wireless manner. The flexible display apparatus 100 is manufactured of flexible material as described above and thus can be bent by the user, whereas the display apparatus 900 is implemented in the form of a general display apparatus which is not flexible. Specifically, the display apparatus 900 may be implemented in the form of various kinds of display apparatuses such as a TV, an electronic album, a monitor, and an advertisement board.

The display apparatus 900 displays various screens. According to an exemplary embodiment, the display apparatus 900 may display various game screens.

In this case, the flexible display apparatus 100 may transmit a command to control a game which is executed in the display apparatus 900 to the display apparatus 900. That is, when the shaking manipulation or swinging manipulation is performed, the flexible display apparatus 100 may transmit a corresponding control signal to the display apparatus 900, and may control a game screen displayed on the screen of the display apparatus 900.

When the control signal corresponding to the shaking manipulation or swinging manipulation is received from the flexible display apparatus 100, the display apparatus 900 performs an operation corresponding to the control signal. The control signal may be implemented in the form of an infrared ray (IR) signal, or may be a communication signal which is transmitted through various interfaces such as Bluetooth, NFC, Wi-Fi, Zigbee, and serial interface.

Figure 25B:
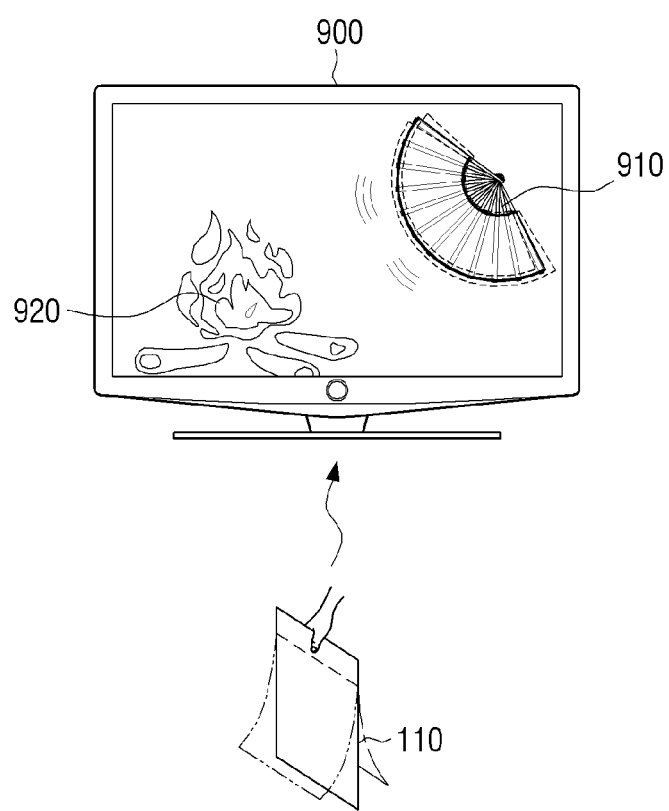

For example, when the display apparatus 900 receives a control signal corresponding to the shaking manipulation from the flexible display apparatus 100 as shown in FIGS. 25A and 25B, the display apparatus 900 may move an object 910 of a fan shape to put out a fire 920 on the game screen.

For another example, when the display apparatus 900 receives a control signal corresponding to the swinging manipulation from the flexible display apparatus 100 as shown in FIGS. 26A and 26B, the display apparatus 900 may move an object 930 of a circular shape to obtain fruits dropping down on the game screen. For example, when the display apparatus 900 receives a control signal indicating that the flexible display apparatus 100 is bent in the Z+ direction, the display apparatus 900 moves the object 930 to the right on the game screen, and, when the display apparatus 900 receives a control signal indicating that the flexible display apparatus 100 is bent in the Z− direction, the display apparatus 900 may move the object 930 to the left on the game screen.

Figure 27:
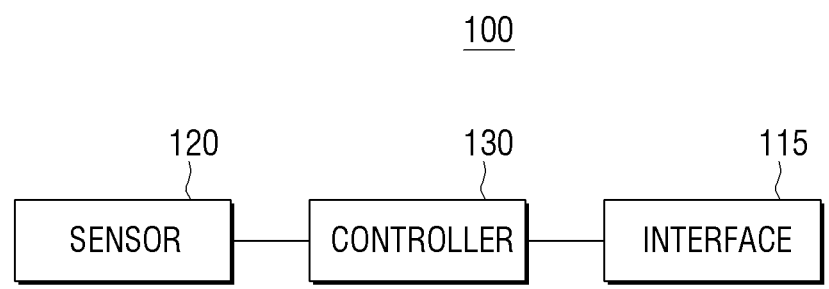
FIG. 27 is a diagram illustrating a configuration of a flexible display apparatus which is interlocked with an external display apparatus.

FIG. 27 is a block diagram to illustrate a configuration of a flexible display apparatus which is interlocked with an external display apparatus. Referring to FIG. 27, the flexible display apparatus 100 includes a sensor 120, a controller 130, and an interface 195.

The sensor 120 and the controller 130 are the same as described above with reference to FIG. 1 and thus a redundant explanation is omitted.

The interface 195 is an element for connecting the flexible display apparatus 100 to the display apparatus 900. The interface 195 may be connected to the display apparatus 900 in various wire or wireless communication methods such as USB interface, Wi-Fi, Zigbee, IEEE, Bluetooth, etc.

However, when the shaking manipulation or swinging manipulation is performed, the controller 130 may transmit a control signal corresponding to each manipulation to the display apparatus 900 such that the display apparatus 900 controls the game screen.

For example, when the shaking manipulation or swinging manipulation is performed, the controller 130 may transmit information on the motion to the display apparatus 900 through the interface 195.

Specifically, the controller 130 may transmit information on a kind of manipulation performed in the flexible display apparatus 100 (for example, information on whether the shaking manipulation or swinging manipulation is performed) and a bending direction to the display apparatus 900. Accordingly, the display apparatus 900 may control the motion of the object displayed on the game screen using the information on the motion received from the flexible display apparatus 100.

Figure 28:
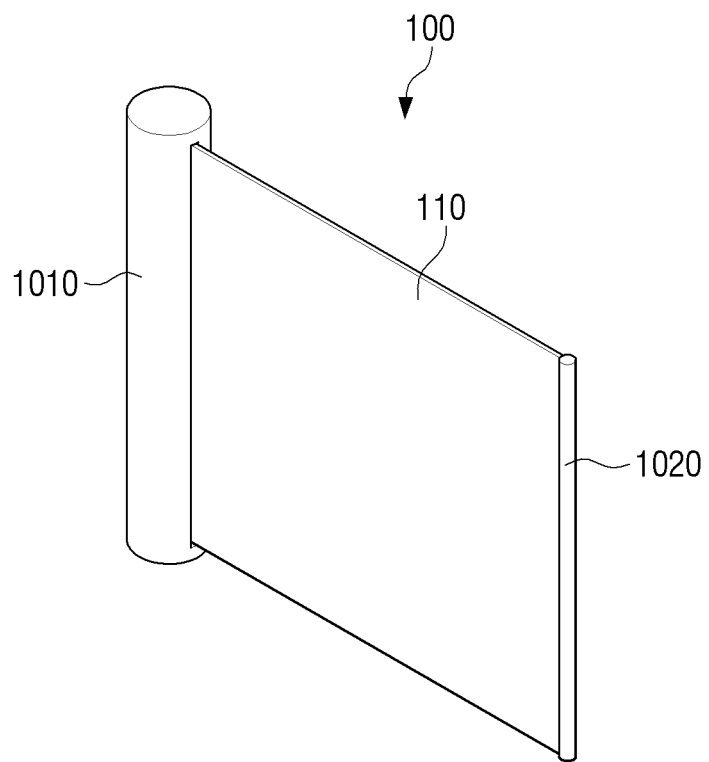
FIGS. 28 and 29 are views illustrating an example of a form of a flexible display apparatus according to an exemplary embodiment.

FIG. 28 is a view illustrating an example of a form of a display apparatus which is embedded in a body. Specifically, a shape of the display apparatus when the display apparatus 100 has flexibility will be explained.

Referring to FIG. 28, the flexible display apparatus 100 includes a body 1010, a display 110, and a grip part 1020.

The body 1010 may serve as a kind of a case containing the display 110. When the flexible display apparatus 100 includes various elements as shown in FIG. 23, elements other than the display 110 and some sensors may be mounted in the body 1010. The body 1010 includes a rotary roller for rolling the display 110. Accordingly, when not in use, the display 110 is rolled about the rotary roller and embedded in the body 1010.

When the user holds the grip part 1020 and pulls the display 110, the rotary roller is rotated in the opposite direction to that of the rolling and rolling is released, so that the display 110 comes out to the outside of the body 1010. A stopper may be provided on the rotary roller. Accordingly, when the user pulls the grip part 1020 by more than a predetermined distance, the rotation of the rotary roller is stopped by the stopper and the display 110 may be fixed. Accordingly, the user can execute various functions using the display 110 that is outside of the body 1010. When the user presses a button to release the stopper, the stopper is released and the rotary roller is rotated in a reverse direction. As a result, the display 110 is rolled in the body 1010. The stopper may have a switch shape to stop an operation of a gear to rotate the rotary roller. Because the rotary roller and the stopper may employ a general rolling structure as it is, detailed illustration and explanation thereof are omitted.

The body 1010 includes a power supply 180. The power supply 180 may be implemented in the form of a battery connector on which a disposable battery is mounted, a secondary cell which can be charged and used multiple times by the user, and a solar cell which generates electricity using solar heat. When the power supply is implemented in the form of the secondary cell, the user may connect the body 1010 to an external power source through a wire and may charge the power supply 180.

In FIG. 28, the body 1010 has a cylindrical shape. However, the shape of the body 1010 may be quadrangular or other polygonal shape. Also, the display 110 may be implemented in various forms such as enclosing the body 1010, rather than being embedded in the body 1010 and being exposed to the outside by being pulled.

Figure 29:
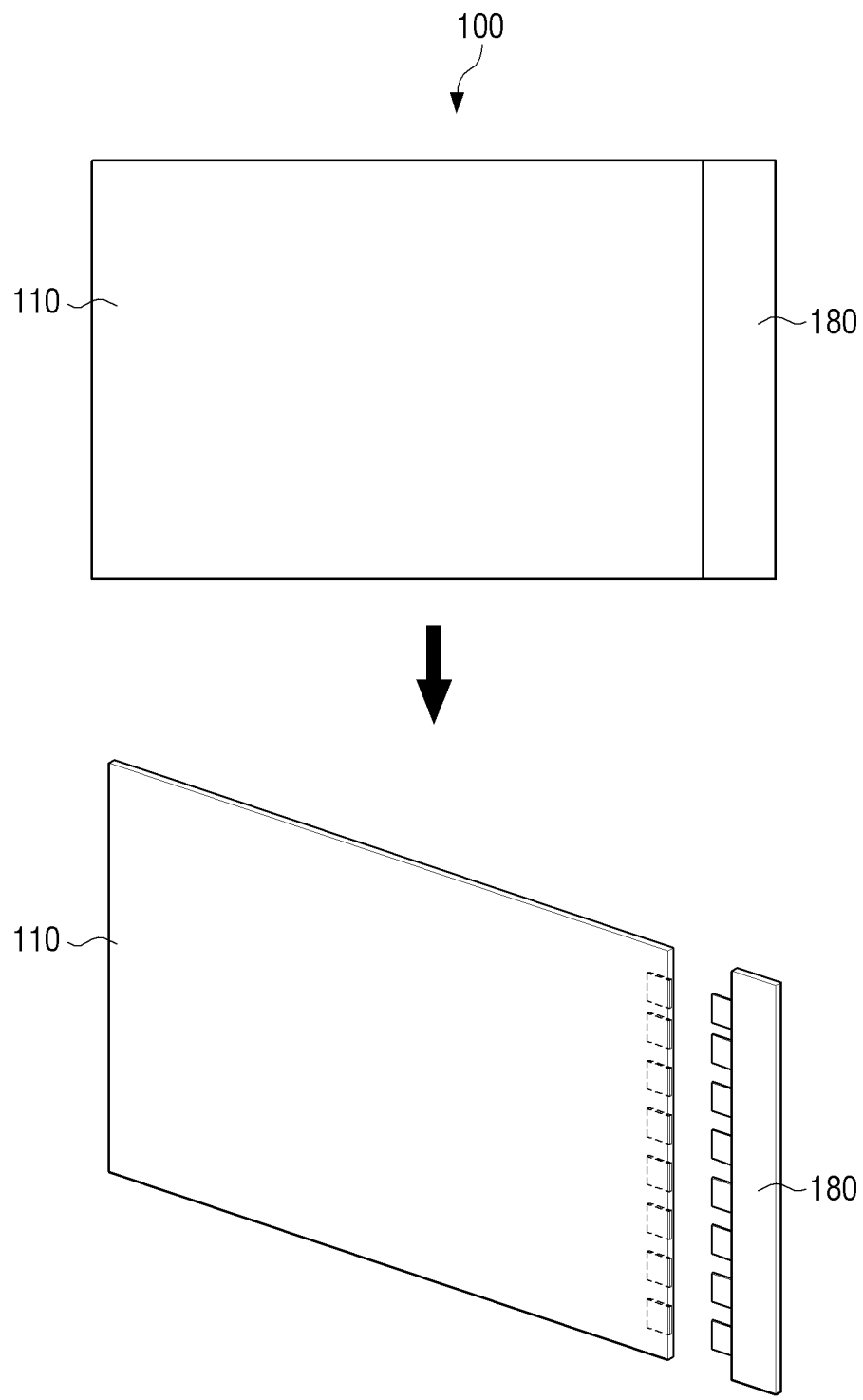

FIG. 29 is a view illustrating a display apparatus in which a power supply 180 is attachable and detachable. Referring to FIG. 29, the power supply 180 is provided on one edge of the flexible display apparatus and is attachable and detachable.

The power supply 180 is made of a flexible material and can be bent along with the display 110. Specifically, the power supply 180 includes a cathode collector, a cathode electrode, an electrolyte, an anode electrode, an anode collector, and a sheath covering the aforementioned members.

For example, the collector may be implemented in the form of an alloy such as TiNi having good elasticity, metal such as copper and aluminum, etc., a conductive material such as metal coated with carbon, carbon, and a carbon fiber, or a conducting polymer, etc. such as polypyrole.

The cathode electrode may be manufactured by a negative electrode material such as metal such as lithium, natrium, zinc, magnesium, cadmium, hydrogen storage alloy, and lead, etc., nonmetal such as carbon, and a high polymer electrode material such as organosulfur.

The anode electrode may be manufactured by a positive electrode material such as sulfur and metal sulfide, lithium transition metal oxide such as $LiCoO_2$, and a polymer electrode material such as $SOCl_2$, $MnO_2$, $Ag_2O$, $Cl_2$, $NiCl_2$, and NiOOH etc. The electrolyte may be implemented in a gel form using PEO, PVdF, PMMA, and PVAC.

The sheath may use a general polymer resin. For example, PVC, HDPE, or epoxy, etc. may be used. Besides these, any material that can prevent damage of a thread-type cell and is freely flexible or bendable may be used for the sheath.

Each of the anode electrode and the cathode electrode in the power supply 180 may include a connector to be electrically connected to an external source.

Referring to FIG. 29, the connector protrudes from the power supply 180 and a recess corresponding to a location, a size, and a shape of the connector is formed on the display 110. Accordingly, the power supply 180 is connected with the display 110 as the connector and the recess are connected to each other. The connector of the power supply 180 is connected to a power connection pad (not shown) of the flexible display apparatus 100 to supply power to the flexible display apparatus 100.

Although the power supply 180 is attached to or detached from one edge of the flexible display apparatus 100 in FIG. 29, this is merely an example. A location and a shape of the power supply 180 may be changed according to a product characteristic. For example, when the flexible display apparatus 100 has a predetermined thickness, the power supply 180 may be mounted on a rear surface of the flexible display apparatus 100.

Figure 30:
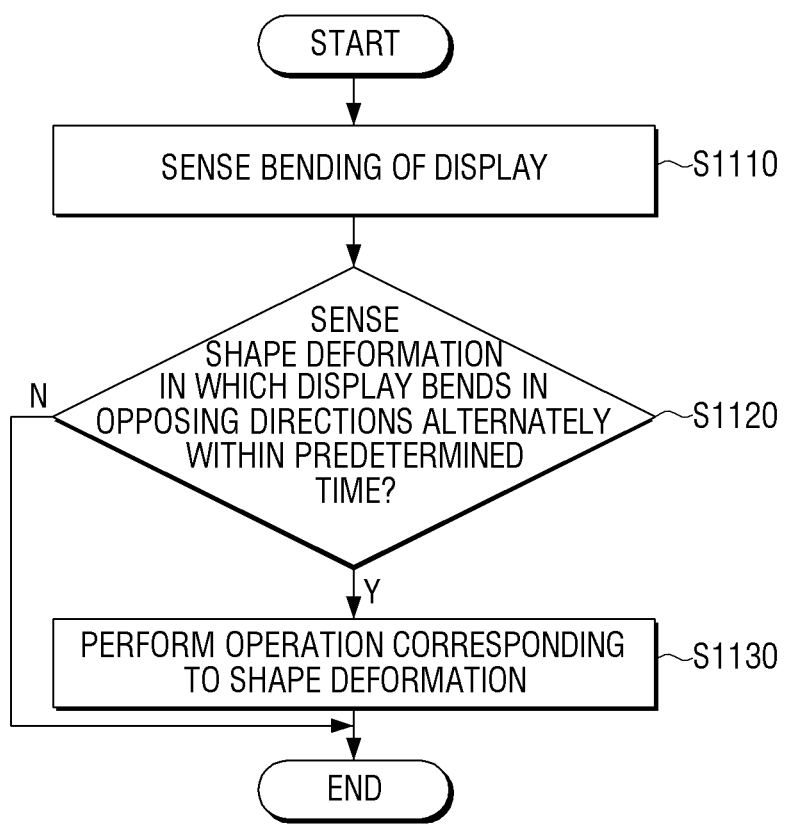
FIG. 30 is a flowchart to illustrate a control method of a flexible display apparatus according to an exemplary embodiment.

FIG. 30 is a flowchart to illustrate a control method of a flexible display apparatus according to an exemplary embodiment. The flexible display apparatus may include a bendable display.

First, bending of the display is sensed (S1110).

When shape deformation in which the display is bent in opposing directions alternately is sensed within a predetermined time (S1120-Y), an operation corresponding to the sensed shape deformation is performed (S1130).

The shape deformation recited herein may be shape deformation in which the display which has been bent in one direction returns to its original state and then continuously is bent in the other direction, and such shape deformation is repeated at least one time.

To achieve this, a user grip on the display is sensed, and, when the user grip is sensed on one edge of the display and shape deformation in which the display is bent in opposing directions alternately is performed, it is determined that a shaking manipulation is performed and an operation corresponding to the shaking manipulation is performed.

Specifically, when a plurality of objects are displayed on the display and the shaking manipulation is performed, the plurality of objects may be rearranged according to a predetermined criterion and displayed on the display.

Also, when a plurality of objects are displayed on the display and the shaking manipulation is performed, at least one object which is selected from among the plurality of objects according to a user command may be moved in a direction opposite to the area where the user grip is sensed and may be displayed.

The at least one moved object may be deleted. Also, the at least one moved object may be transmitted to other devices.

When a plurality of objects are displayed on the display and the shaking manipulation is performed, objects other than at least one object that is displayed on the area where the user grip is sensed may be deleted.

These exemplary embodiments have been described above with reference to FIGS. 13 to 20.

On the other hand, a user grip on the display is sensed, and, when the user grip is sensed on opposite edges of the display and shape deformation in which the display is bent in opposing directions alternately is performed, it is determined that a swinging manipulation is performed and an operation corresponding to the swinging manipulation is performed.

Specifically, when a plurality of objects are displayed on the display and the swinging manipulation is performed, at least one object that is selected from among the plurality of objects according to a user command may be deleted and the at least one selected object may be rearranged and displayed.

These exemplary embodiments have been described above with reference to FIGS. 21 and 22.

In the above-described exemplary embodiments, it is determined whether the shaking manipulation or the swinging manipulation is performed according to whether the user grip is sensed on one edge or opposite edges of the flexible display apparatus. However, this is merely an example. It may be determined whether the shaking manipulation or the swinging manipulation is performed using the acceleration sensor and the bend sensor.

A non-transitory computer readable medium, which stores a program for performing the control methods according the exemplary embodiments in sequence, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

Although a bus is not illustrated in the block diagrams of the display apparatus, the elements of the display apparatus may communicate with one another through a bus. Also, the display apparatus may further include a processor such as a CPU and a micro processor to perform the above-described various operations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
a display that is bendable;
a sensor configured to sense deformation of the display; and
a controller configured to perform an operation corresponding to the sensed deformation in response to the sensed deformation being shape deformation in which the display is alternately bent in opposing directions,
wherein the shape deformation comprises a first type shape deformation in which the display is alternately bent in opposing directions in a state where only one side of the display is touched, and a second type shape deformation in which the display is alternately bent in opposing directions in a state where both sides of the display are touched, and
wherein the operation is determined according to whether the sensed deformation is the first type shape deformation or the second type shape deformation.

2. The flexible display apparatus as claimed in claim 1, wherein the shape deformation is shape deformation in which the display is bent in a first direction, returns to its original state, is bent in a second direction opposite the first direction, and returns again to its original state, and that is repeated at least one time.

3. The flexible display apparatus as claimed in claim 1, wherein the sensor is further configured to sense a user grip on the display,
wherein the controller is further configured to determine that a shaking manipulation is performed in response to a user grip being sensed on one edge of the display and the sensed deformation being the shape deformation.

4. The flexible display apparatus as claimed in claim 3, wherein the display is configured to display a plurality of objects and the controller is further configured to control the display to rearrange the displayed plurality of objects according to a predetermined criterion, in response to determining the shaking manipulation is performed.

5. The flexible display apparatus as claimed in claim 3, wherein the display is configured to display a plurality of objects and the controller is further configured to control the display to move at least one object which is selected from among the plurality of objects according to a user command in a direction opposite an area where the user grip is sensed, in response to determining the shaking manipulation is performed.

6. The flexible display apparatus as claimed in claim 5, wherein the controller is further configured to control the display to delete the at least one moved object.

7. The flexible display apparatus as claimed in claim 5, further comprising:
a communicator configured to communicate with other devices,
wherein the controller is further configured to control the communicator to transmit, to at least one of other devices, content corresponding to the at least one moved object.

8. The flexible display apparatus as claimed in claim 3, wherein the display is configured to display a plurality of objects and the controller is configured to control the display to delete objects among the plurality of objects other than at least one object that is displayed on an area where the user grip is sensed, in response to determining the shaking manipulation is performed.

9. The flexible display apparatus as claimed in claim 1, wherein the sensor is configured to sense a user grip on the display,
wherein the controller further configured to determine that a swinging manipulation is performed in response to the user grip being sensed on opposite edges of the display and the sensed deformation being the shape deformation.

10. The flexible display apparatus as claimed in claim 9, wherein the display is configured to display a plurality of objects and the controller is further configured to control the display to delete at least one object which is selected from among the plurality of objects according to a user command, and rearrange the at least one selected object and display the object in response to determining the swinging manipulation is performed.

11. A control method of a flexible display apparatus comprising a display that is bendable, the method comprising:
sensing deformation of the display; and
performing an operation corresponding to the sensed deformation in response to the sensed deformation being shape deformation in which the display is alternately bent in opposing directions,
wherein the shape deformation comprises a first type shape deformation in which the display is alternately bent in opposing directions in a state where only one side of the display is touched, and a second type shape deformation in which the display is alternately bent in opposing directions in a state where both sides of the display are touched, and
wherein the operation is determined according to whether the sensed deformation is the first type shape deformation or the second type shape deformation.

12. The method as claimed in claim 11,
wherein the shape deformation is shape deformation in which the display is bent in a first direction, returns to its original state, is bent in a second direction opposite the first direction, and returns again to its original state, and that is repeated at least one time.

13. The method as claimed in claim 11, wherein the sensing comprises sensing a user grip on the display,
wherein the performing comprises determining that a shaking manipulation is performed, and performing an operation corresponding to the shaking manipulation in response to a user grip being sensed on one edge of the display and the sensed deformation being the shape deformation.

14. The method as claimed in claim 13, wherein the performing further comprises rearranging a plurality of objects displayed on the display according to a predetermined criterion in response to the determining that the shaking manipulation is performed.

15. The method as claimed in claim 13, wherein the performing further comprises moving at least one object which is selected from among a plurality of objects displayed on the display according to a user command in a direction opposite to an area where the user grip is sensed, in response to the determining the shaking manipulation is performed.

16. The method as claimed in claim 15, wherein the performing further comprises deleting the at least one moved object.

17. The method as claimed in claim 15, further comprising transmitting the at least one moved object to other devices.

18. The method as claimed in claim 13, wherein the performing further comprises, deleting a plurality of objects other than at least one object that is displayed on an area where the user grip is sensed in response to the plurality of objects being displayed on the display and the shaking manipulation being performed.

19. The method as claimed in claim 11, further comprising sensing a user grip on the display,
wherein the performing comprises determining that a swinging manipulation is performed, and performing an operation corresponding to the swinging manipulation, in response to the user grip being sensed on opposite edges of the display and the sensed deformation being the shape deformation.

20. The method as claimed in claim 19, wherein the performing further comprises deleting at least one object which is selected from among a plurality of objects displayed on the display according to a user command, and rearranging the at least one selected object and displaying the object, in response to and the determining that the swinging manipulation is performed.

21. A flexible display device comprising:
a flexible display surface comprising at least one sensor configured to detect an oscillated bending of the flexible display; and a controller configured to control execution of an operation associated with the detected oscillated bending, wherein the oscillated bending is shape deformation in which the display is alternately bent in opposing directions, wherein the shape deformation comprises a first type shape deformation in which the display is alternately bent in opposing directions in a state where only one side of the display is touched, and a second type shape deformation in which the display is alternately bent in opposing directions in a state where both sides of the display are touched, and wherein the operation is determined according to whether the sensed deformation is the first type shape deformation or the second type shape deformation.

22. A method of controlling a flexible display, the method comprising:

detecting an oscillated bending of a flexible display using at least one sensor disposed on the flexible display; and controlling execution of an operation associated with the detected oscillated bending, wherein the oscillated bending is shape deformation in which the display is alternately bent in opposing directions, wherein the shape deformation comprises a first type shape deformation in which the display is alternately bent in opposing directions in a state where only one side of the display is touched, and a second type shape deformation in which the display is alternately bent in opposing directions in a state where both sides of the display are touched, and wherein the operation is determined according to whether the sensed deformation is the first type shape deformation or the second type shape deformation.

23. The flexible display apparatus as claimed in claim 1, wherein the controller is further configured to perform the operation corresponding to the sensed deformation when the sensed deformation occurred for more than the predetermined number of times for the predetermined time period, and the predetermined time being definable by a user.

\* \* \* \* \*